US010459154B2

(12) United States Patent
Yokosawa

(10) Patent No.: US 10,459,154 B2
(45) Date of Patent: *Oct. 29, 2019

(54) ILLUMINATION APPARATUS AND ILLUMINATION SYSTEM

(71) Applicant: Sony Corporation, Tokyo (JP)

(72) Inventor: Nobuyuki Yokosawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,248

(22) Filed: Jan. 3, 2019

(65) Prior Publication Data

US 2019/0162894 A1    May 30, 2019

Related U.S. Application Data

(63) Continuation of application No. 15/192,213, filed on Jun. 24, 2016, now Pat. No. 10,209,431, which is a
(Continued)

(30) Foreign Application Priority Data

Apr. 15, 2013    (JP) .................. 2013-085006

(51) Int. Cl.
*F21V 8/00* (2006.01)
*F21V 23/02* (2006.01)
(Continued)

(52) U.S. Cl.
CPC .............. *G02B 6/0083* (2013.01); *F21S 8/04* (2013.01); *F21V 23/023* (2013.01); *F21V 33/0052* (2013.01); *G02B 6/0038* (2013.01); *G02B 6/0043* (2013.01); *G02B 6/0061* (2013.01); *G02B 6/0081* (2013.01); *G02B 6/0088* (2013.01); *F21V 17/14* (2013.01); *F21V 23/02* (2013.01); *F21Y 2105/00* (2013.01);
(Continued)

(58) Field of Classification Search
None
See application file for complete search history.

(56) References Cited

U.S. PATENT DOCUMENTS

2009/0129121 A1    5/2009    Yoneda
2010/0118533 A1    5/2010    Hemby
(Continued)

FOREIGN PATENT DOCUMENTS

JP    2004-184768    7/2004
JP    2008-104022    5/2008

*Primary Examiner* — Alexander K Garlen
(74) *Attorney, Agent, or Firm* — Dentons US LLP

(57) ABSTRACT

An illumination apparatus including a light-emitting unit and an apparatus-holding section. The light-emitting unit includes a light guide plate with a center portion being opened, a light source that inputs light from a side of an inner wall of the light guide plate, and a reflective film formed on a side of an upper surface of the light guide plate to reflect light propagated in the light guide plate. The light-emitting unit outputs light from a light output surface in opposite to the upper surface of the light guide plate. The apparatus-holding section detachably holds an electronic apparatus, is capable of removing the electronic apparatus from a side of an output direction of light from the light output surface, and includes a center of a surface parallel to the light output surface, which is positioned inside a light output area of the light output surface.

14 Claims, 15 Drawing Sheets

Related U.S. Application Data continuation of application No. 14/246,500, filed on Apr. 7, 2014, now Pat. No. 9,395,482.

(51) Int. Cl.
  *F21V 33/00* (2006.01)
  *F21S 8/04* (2006.01)
  *F21Y 115/10* (2016.01)
  *F21V 17/14* (2006.01)
  *F21Y 105/00* (2016.01)

(52) U.S. Cl.
  CPC ......... *F21Y 2115/10* (2016.08); *G02B 6/0045* (2013.01); *G02B 6/0073* (2013.01)

(56) References Cited

U.S. PATENT DOCUMENTS

| | | |
|---|---|---|
| 2013/0003360 A1 | 1/2013 | Igaki et al. |
| 2013/0021823 A1 | 1/2013 | Yamagami |
| 2013/0044480 A1 | 2/2013 | Sato et al. |
| 2013/0201668 A1 | 8/2013 | Chien |
| 2013/0286667 A1 | 10/2013 | Sampsell et al. |
| 2014/0049400 A1 | 2/2014 | Hoelzer |
| 2014/0218888 A1 | 8/2014 | Chen |

…

ILLUMINATION APPARATUS AND ILLUMINATION SYSTEM

CROSS REFERENCE TO RELATED APPLICATIONS

This application is a continuation of U.S. patent application Ser. No. 15/192,213 filed Jun. 24, 2016, which is a continuation of U.S. patent application Ser. No. 14/246,500 filed Apr. 7, 2014, now U.S. Pat. No. 9,395,482 issued Jul. 19, 2016, the entireties of which are incorporated herein by reference to the extent permitted by law. The present application claims the benefit of Japanese Priority Patent Application JP 2013-085006 filed Apr. 15, 2013, the entire contents of which are incorporated herein by reference.

BACKGROUND

The present disclosure relates to an illumination apparatus configured to be capable of detachably holding an electronic apparatus and to an illumination system including an illumination apparatus and an electronic apparatus.

As described in Japanese Patent Application Laid-open No. 2004-184768 (hereinafter, referred to as Patent Document 1), Japanese Patent Application Laid-open No. 2008-104022 (hereinafter, referred to as Patent Document 2), and the like, there has been known an illumination system of a combination of an illumination apparatus and an electronic apparatus.

For example, Patent Document 1 discloses an illumination system of a combination of an illumination apparatus and a projector apparatus.

In this illumination system, an electronic apparatus is provided on an upper side of the illumination apparatus serving as a ceiling light. Specifically, the electronic apparatus is provided between a ceiling and the illumination apparatus. The provision of the electronic apparatus on the upper side of the illumination apparatus is for the purpose of preventing a reduction in light amount from being caused when the electronic apparatus provided on a lower side of the illumination apparatus shields light emitted from the illumination apparatus.

Patent Document 2 discloses an illumination system formed integrally with a plurality of speakers for configuring a multi-surround system in an illumination apparatus serving as the ceiling light.

In this illumination system, the electronic apparatus is provided at the same height as the illumination apparatus.

SUMMARY

However, in the system in which the electronic apparatus is located above the illumination apparatus as in Patent Document 1, it is necessary to remove the illumination apparatus in order to attach and detach the electronic apparatus. Therefore, the attachment and/detachment of the electronic apparatus are cumbersome, and hence such a system is not appropriate for making the electronic apparatus freely exchangeable.

On the other hand, in the illumination system described in Patent Document 2 in which the electronic apparatus is provided at the same height as the illumination apparatus, light sockets are provided between the plurality of speakers arranged in an annular form, and hence it is difficult to ensure an area of a light output surface. Further, individual lights serves as so-called spot lights, and hence it is difficult to uniformly light up the entire room.

In view of such circumstances, it is desirable to provide an illumination system that makes an electronic apparatus freely exchangeable as an illumination system to which the electronic apparatus can be attached and has good lighting performance.

According to an embodiment of the present disclosure, there is provided an illumination apparatus including: a light-emitting unit including a light guide plate having a shape in which a center portion is opened, a light source configured to input light from a side of an inner wall of the light guide plate, and a reflective film that is formed on a side of an upper surface of the light guide plate and configured to reflect light propagated in the light guide plate, the light-emitting unit being configured to output light from a light output surface that is an opposite surface of the upper surface of the light guide plate; and an apparatus-holding section configured to detachably hold an electronic apparatus, the apparatus-holding section being configured to be capable of removing the electronic apparatus from a side of an output direction of light from the light output surface and including a center of a surface that is parallel to the light output surface, the center being positioned inside a light output area of the light output surface, the light output area being an area from which light is output.

Due to the apparatus-holding section as described above, the electronic apparatus can be removed without removing the illumination apparatus. Further, the electronic apparatus is held near the center portion of the illumination apparatus.

Further, due to the light guide plate having the above-mentioned structure, the light output surface of the light-emitting unit can be formed not as discontinuous surfaces but as a relatively large continuous surface.

In the illumination apparatus according to the embodiment of the present disclosure, it is desirable that the apparatus-holding section be positioned inside the light output area.

With this, the light amount emitted from the light output surface to the electronic apparatus is further reduced.

It is desirable that the illumination apparatus according to the embodiment of the present disclosure further include a power-supply section including a built-in power-supply circuit configured to generate an operational voltage based on a commercial alternating-current power supply, in which the light-emitting unit be configured to be detachably attached to the power-supply section.

With this, it becomes easy to address a failure and the like.

In the illumination apparatus according to the embodiment of the present disclosure, it is desirable that the light-emitting unit include a light-emitting main-body portion including the light guide plate, an attachment bungle portion that is attached to the power-supply section, and a plurality of bridge portions configured to connect between the light-emitting main-body portion and the attachment bangle portion.

With this, when the light-emitting unit is attached to the power-supply section, a user can predict the position of an attachment portion to the power-supply section formed in the attachment bangle portion based on the positions at which the bridge portions are formed.

It is desirable that the illumination apparatus according to the embodiment of the present disclosure further include a power-supply circuit configured to generate an operational voltage based on a commercial alternating-current power supply; a micro-computer configured to operate based on the operational voltage generated by the power-supply circuit; an electrical power output terminal for supplying the operational voltage generated by the power-supply circuit to the electronic apparatus; and a data communication terminal for performing a data communication with the electronic apparatus.

With this, the power supply from the illumination apparatus to the electronic apparatus and the data communication between the illumination apparatus and the electronic apparatus can be performed.

In the illumination apparatus according to the embodiment of the present disclosure, it is desirable that a plurality of dots or a plurality of grooves for scattering light be formed in the upper surface of the light guide plate.

With this, it becomes easy to control the light distribution pattern.

In the illumination apparatus according to the embodiment of the present disclosure, it is desirable that the plurality of dots or the plurality of grooves be formed at constant pitches from an inner peripheral side to an outer peripheral side of the light guide plate and gradually increased in size from the inner peripheral side to the outer peripheral side of the light guide plate.

With this, uniform light distribution is realized.

According to another embodiment of the present disclosure, there is provided an illumination system including: an illumination apparatus; and an electronic apparatus, the electronic apparatus including a light-emitting unit including a light guide plate having a shape in which a center portion is opened, a light source configured to input light from a side of an inner wall of the light guide plate, and a reflective film that is formed on a side of an upper surface of the light guide plate and configured to reflect light propagated in the light guide plate, the light-emitting unit being configured to output light from a light output surface that is an opposite surface of the upper surface of the light guide plate; and an apparatus-holding section configured to detachably hold an electronic apparatus, the apparatus-holding section being configured to be capable of removing the electronic apparatus from a side of an output direction of light from the light output surface and including a center of a surface that is parallel to the light output surface, the center being positioned inside a light output area of the light output surface, the light output area being an area from which light is output.

The electronic apparatus includes a held section configured to be held by the apparatus-holding section.

Also with the illumination system according to the embodiment of the present disclosure, due to the apparatus-holding section, the electronic apparatus can be removed without removing the illumination apparatus, and further, the electronic apparatus is held near the center portion of the illumination apparatus, as in the illumination apparatus according to the above-mentioned embodiment of the present disclosure.

Further, due to the light guide plate having the above-mentioned structure, the light output surface of the light-emitting unit can be formed not as discontinuous surfaces but as a relatively large continuous surface.

In the illumination system according to the embodiment of the present disclosure, it is desirable that a forming position of the held section in the electronic apparatus and a forming position of the held section in the electronic apparatus be set such that an edge of the electronic apparatus on the side of the output direction of the light be located on the side of the output direction of the light with respect to an edge of the illumination apparatus on the side of the output direction of the light.

By appropriately setting the position relationship between the edge of the illumination apparatus on the side of the output direction of the light and the edge of the electronic apparatus on the side of the output direction of the light, functional deterioration of the electronic apparatus is prevented.

In the illumination system according to the embodiment of the present disclosure, it is desirable that the electronic apparatus be a camera apparatus or a projector apparatus.

An edge of the camera apparatus or the projector apparatus on the side of the output direction of the light is located on the side of the output direction of the light with respect to the edge of the illumination apparatus on the side of the output direction of the light, and hence functional deterioration of the camera apparatus or the projector apparatus is prevented.

According to the embodiments of the present disclosure, it is possible to provide an illumination system that makes an electronic apparatus freely exchangeable as an illumination system to which the electronic apparatus can be attached and has good lighting performance.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described.

Note that the descriptions will be made in the following order.

<1. Outline of Illumination System>
<2. Configurations of Illumination Apparatus and Electronic Apparatus>
[2-1. Outline of Outer Appearance and Configuration]
[2-2. Configurations of Power-Supply Section and Light-Emitting Unit]
<3. Attachment of Electronic Apparatus>
<4. Conclusion of Embodiment>
<5. Modified Example>
<6. Present Disclosure>

1. Outline of Illumination System

Figure 1:
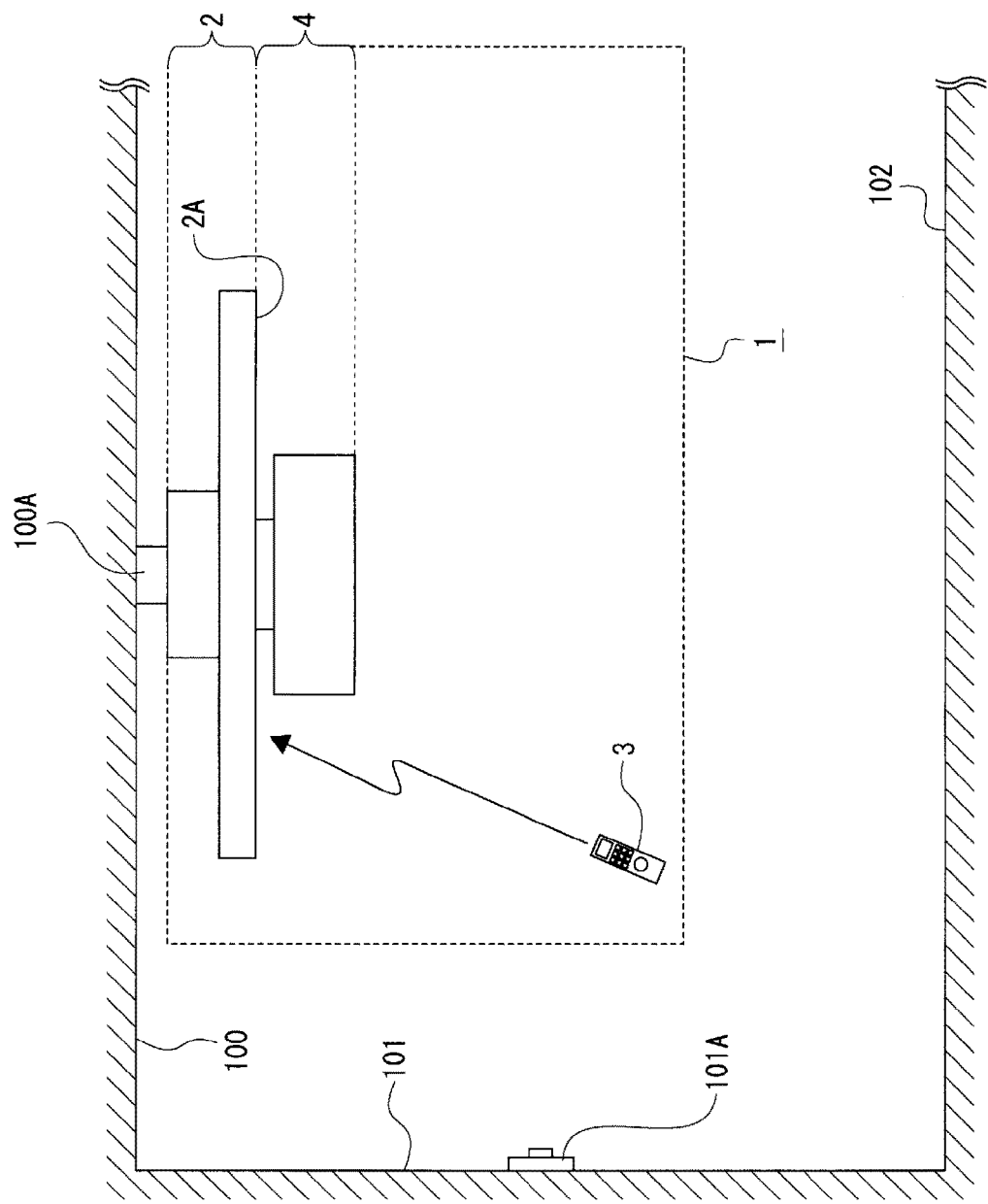
FIG. 1 is a view for explaining an outline of an illumination system according to an embodiment.

FIG. 1 is a view for explaining an outline of an illumination system 1 as an embodiment of the present disclosure.

The illumination system 1 according to this embodiment includes an illumination apparatus 2, a remote controller 3 for operating the illumination apparatus 2, and an electronic apparatus 4 detachably attached to the illumination apparatus 2.

The illumination apparatus 2 is an illumination apparatus serving as a so-called ceiling light. The illumination apparatus 2 is attached to a ceiling rosette 100A provided to a ceiling surface 100 in a room.

The illumination apparatus 2 includes a light output surface 2A that emits light for illuminating the room. The illumination apparatus 2 serves as the ceiling light, and hence the light output surface 2A is a surface opposed to a floor surface 102 in the room.

The illumination apparatus 2 is attached to the ceiling rosette 100A, which enables an input of the commercial alternating-current (AC) power supply to be performed. Turning ON and OFF of the input of the commercial AC power supply into the illumination apparatus 2 are performed by a wall switch 101A provided to a wall surface 101 in the room.

Further, the illumination apparatus 2 performs, according to an operation of the remote controller 3, each of operations of lighting/extinction and light control. Note that lighting/extinction of the illumination apparatus 2 is performed also by the ON/OFF operations of the wall switch 101A.

In this embodiment, it is assumed that the electronic apparatus 4 is used as various types of electronic apparatuses 4 having different functions. Examples of the electronic apparatus 4 include, for example, an acoustic reproduction apparatus with a speaker, a projector apparatus, a camera apparatus, an ion generator, a fire alarm, and a home planetarium device.

Held sections having a common structure are formed in the various types of the electronic apparatuses 4 having different functions as a corresponding apparatus of the illumination system 1 of this example. In the illumination apparatus 2, there is formed an apparatus-holding section capable of detachably holding the held section having such a common structure.

Note that the held section and the apparatus-holding section will be described later in detail.

Note that, herein, directions are defined with a state in which the illumination apparatus 2 is attached to the ceiling rosette 100A being a reference. Specifically, an upper direction indicates a direction toward the ceiling surface 100 and a lower direction indicates a direction toward the floor surface 102. Further, upper and lower directions will be also referred to as a vertical direction.

2. Configurations of Illumination Apparatus and Electronic Apparatus

[2-1. Outline of Outer Appearance and Configuration]

Figure 2:
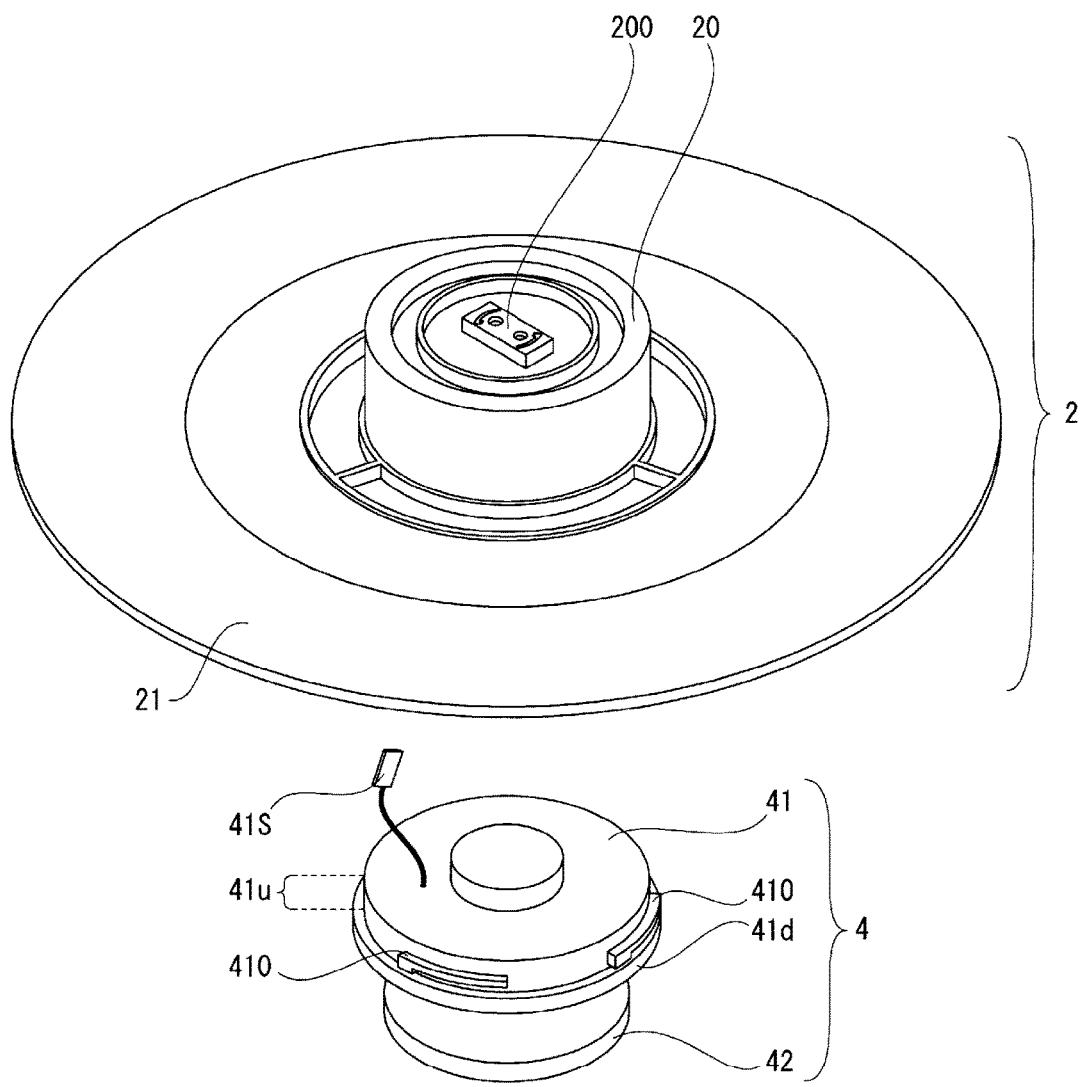
FIG. 2 is an outer appearance perspective view of an illumination apparatus and an electronic apparatus.
Figure 3:
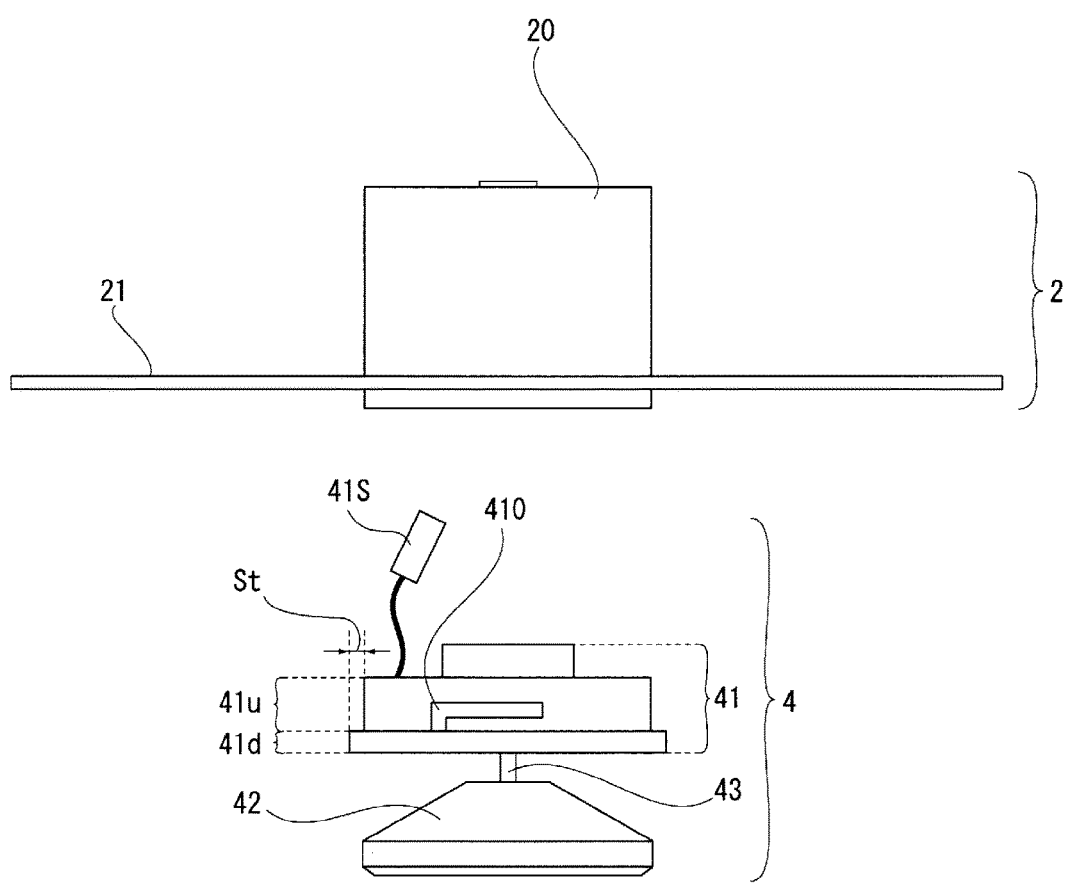
FIG. 3 is a front view of the illumination apparatus and the electronic apparatus.

FIGS. 2 and 3 are an outer appearance perspective view and a front view of the illumination apparatus 2 and the electronic apparatus 4, respectively.

The illumination apparatus 2 includes a power-supply section 20 and a light-emitting unit 21. The power-supply section 20 has an almost-cylindrical outer shape. The light-emitting unit 21 has an almost-disk-like outer shape in which a center portion is opened.

In a center portion of an upper surface of the power-supply section 20, there is provided an illumination-side rosette 200 attached to the ceiling rosette 100A shown in FIG. 1.

Note that, in the illumination apparatus 2 of this example, the light-emitting unit 21 is detachable from the power-supply section 20. Configurations of the power-supply section 20 and the light-emitting unit 21 will be described later in detail.

The electronic apparatus 4 includes an upper unit 41 and a lower unit 42. The upper unit 41 and the lower unit 42 are connected to each other via a connection portion 43 formed in a plate shape, for example.

In the upper unit 41, an upper casing portion 41u having an almost-cylindrical outer shape is formed on a base plate 41d having an almost-disk outer shape. In a center portion of an upper surface of the upper casing portion 41u, a protrusion portion having an almost-cylindrical shape is formed. The protrusion portion has a diameter smaller than that of the upper casing portion 41u.

The diameter of the base plate 41d is set to be slightly larger than the diameter of the upper casing portion 41u. With this, an upper surface of the base plate 41d projects to the outside by an amount corresponding to an offset St (see FIG. 3) depending on such a diameter difference.

In a side surface of the upper casing portion 41u, a plurality of held members 410 are formed. The held members 410 are members provided to be engaged with apparatus-holding members 203 to be described later that is provided on a side of the illumination apparatus 2 upon attachment to the illumination apparatus 2, such that the electronic apparatus 4 is held by the illumination apparatus 2.

Each of the held members 410 is formed to be an almost-L-shape member. Specifically, the held member 410 is formed such that a linear part corresponding to the longer leg of the L-shape is parallel to an in-plane direction of the base plate 41d and an end surface of a linear part orthogonal to the longer leg of the L-shape is held in contact with the upper surface of the base plate 41d.

In the case of this example, three held members 410 are formed at predetermined intervals. Specifically, the held members 410, 410, and 410 are formed at intervals of 120°.

Further, a connector 41S for performing an electrical connection to the illumination apparatus 2 is also provided to the electronic apparatus 4. In the case of this example, the connector 41S is formed in a leading end portion of a cable pulled out from an upper surface side of the upper casing portion 41u.

[2-2. Configurations of Power-Supply Section and Light-Emitting Unit]

Referring to FIGS. 4 to 9, the configurations of the power-supply section 20 and the light-emitting unit 21 will be described.

Figure 4:
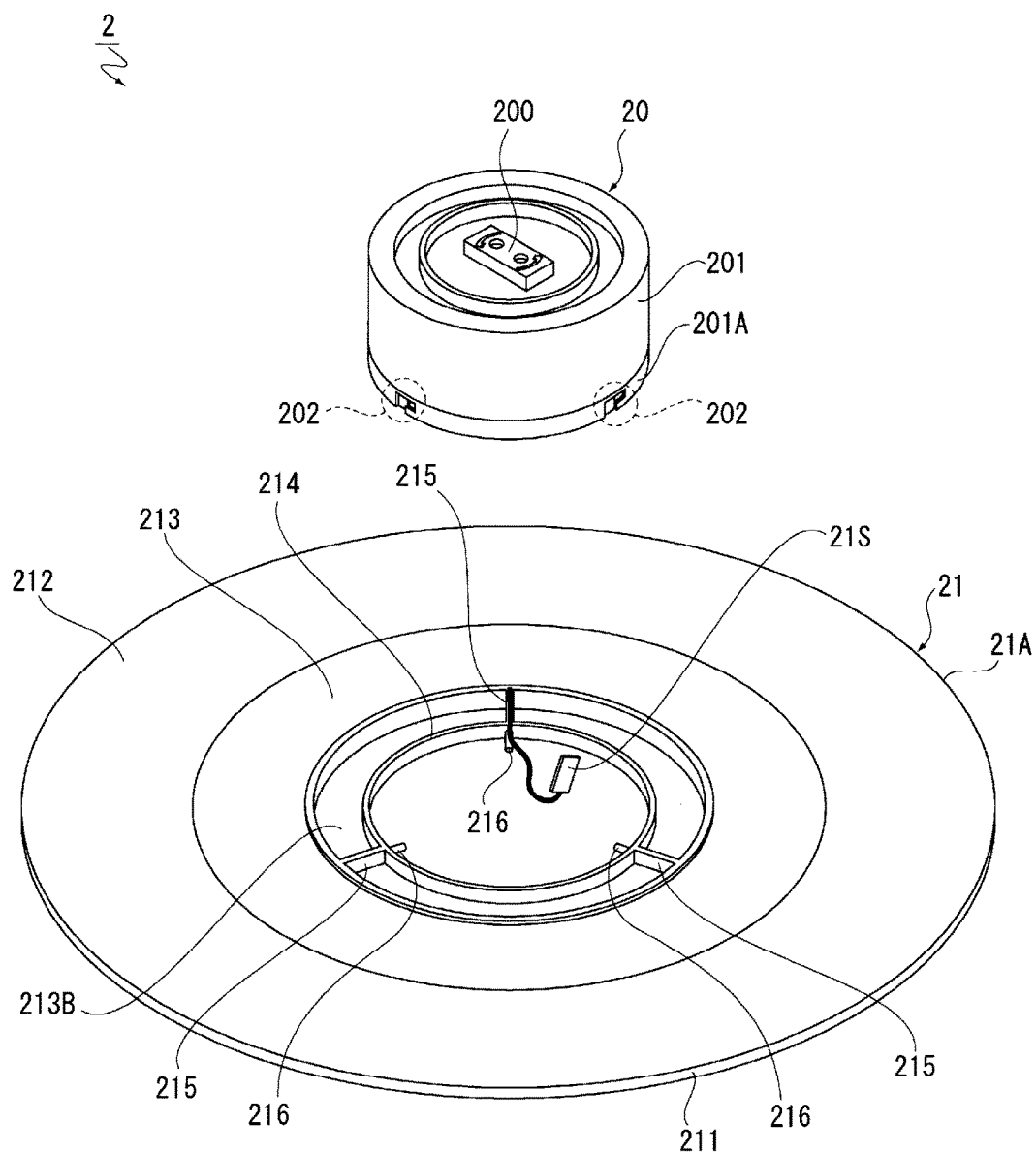
FIG. 4 is a perspective view indicating an outer appearance of the illumination apparatus in a state in which a light-emitting unit is removed from a power-supply section.
Figure 5A:
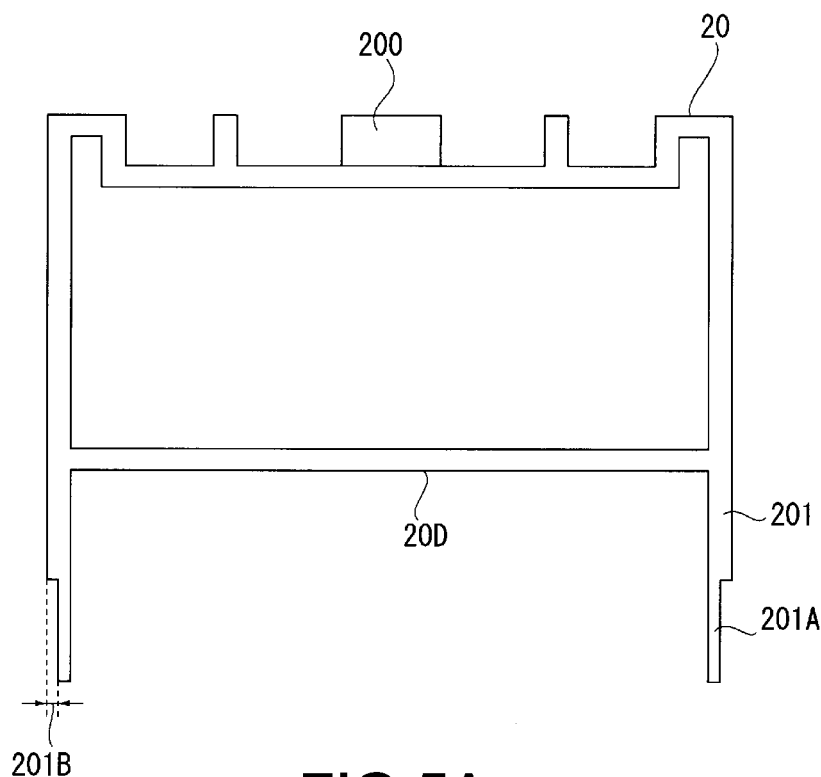
FIGS. 5A and 5B are a cross-sectional view (FIG. 5A) and a bottom view (FIG. 5B) of the power-supply section.
Figure 5B:
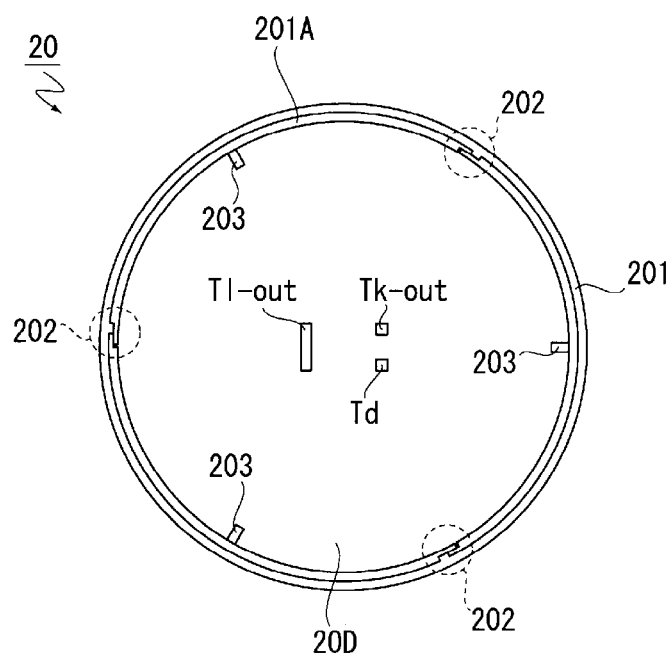

FIG. 4 is a perspective view showing an outer appearance of the illumination apparatus 2 in a state in which the light-emitting unit 21 is removed from the power-supply section 20. FIGS. 5A and 5B are a cross-sectional view (FIG. 5A) and a bottom view (FIG. 5B) of the power-supply section 20.

The power-supply section 20 includes a side wall portion 201 forming a side surface of an almost cylindrical casing thereof. The casing of the power-supply section 20 including the side wall portion 201 is made of, for example, a resin.

As shown in the cross-sectional view of FIG. 5A, the power-supply section 20 includes an almost-cylindrical cavity portion at an inner lower portion thereof. This cavity portion functions as a space for housing the upper casing portion 41u of the electronic apparatus 4 upon attachment.

A surface of the power-supply section 20 that is to be held in contact with an upper portion of the cavity portion will be referred to as a bottom surface 20D of the power-supply section 20.

The side wall portion 201 of the power-supply section 20 is thinned at a lower end portion thereof. The thinned portion will be referred to as a side wall lower end portion 201A. The side wall lower end portion 201A is formed as if the lower end portion of the side wall portion 201 is shaved from an outer peripheral side.

Thus, in the side wall portion 201, a step portion 201B is formed as a recess extending to an inner peripheral side, corresponding to the portion in which the side wall lower end portion 201A is formed.

The side wall lower end portion 201A is provided with a plurality of light-emitting unit-holding portions 202 (see FIGS. 4 and 5B) for detachably holding the light-emitting unit 21. In the case of this example, three light-emitting unit-holding portions 202 are provided at intervals of 120°. Further, each of the light-emitting unit-holding portions 202 is provided to the lower end portion of the side wall lower end portion 201A.

Note that a detailed configuration of the light-emitting unit-holding portions 202 will be described later.

In the bottom surface 20D of the power-supply section 20, there are formed an electrical-power output terminal Tl-out, an electrical-power output terminal Tk-out, and a data communication terminal Td (see FIG. 5B). The electrical-power output terminal Tl-out serves to supply an electrical power necessary to emit light to the light-emitting unit 21. The electrical-power output terminal Tk-out serves to supply an operational voltage to the electronic apparatus 4. The data communication terminal Td serves to performing a data communication with the electronic apparatus 4.

Figure 6:
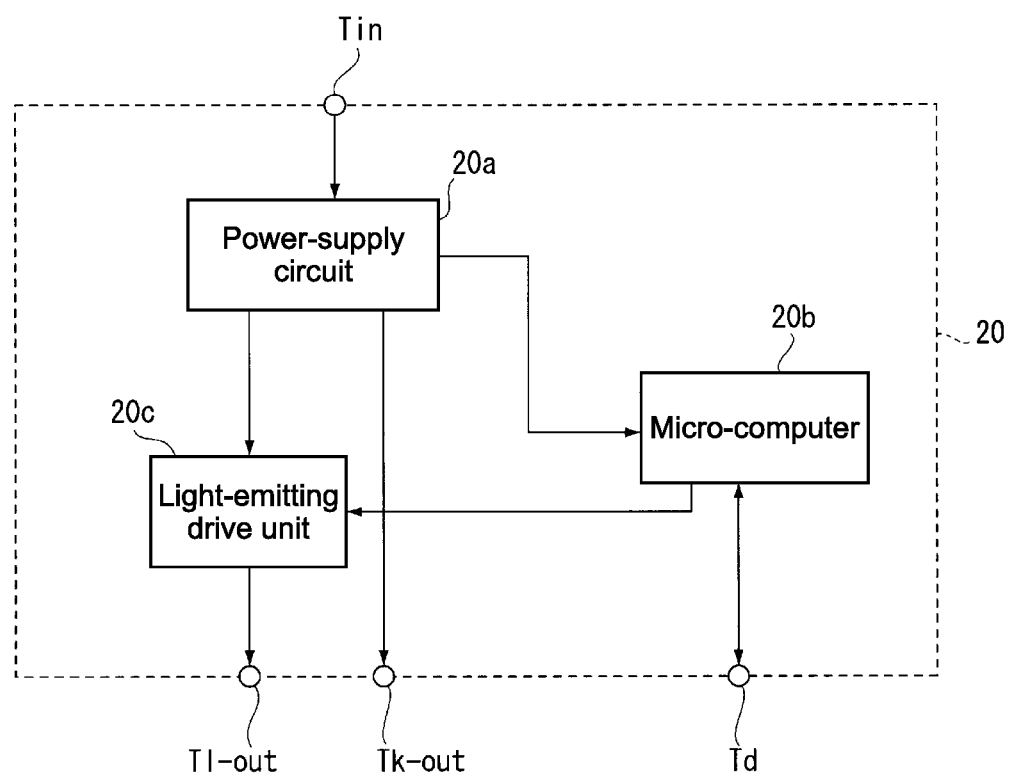
FIG. 6 is a block diagram for explaining an inner circuit configuration of the power-supply section.

As shown in the block diagram of FIG. 6, the power-supply section 20 includes therein a power-supply circuit 20a, a micro-computer 20b, and a light-emitting drive unit 20c.

The commercial AC power supply is input into the power-supply circuit 20a via an electrical-power input terminal Tin provided to the illumination-side rosette 200. Based on the input commercial AC power supply, the power-supply circuit 20a generates a driving operational voltage for operating the light-emitting drive unit 20c, a micro-computer operational voltage for operating the micro-computer 20b, and an apparatus operational voltage for operating the electronic apparatus 4. The apparatus operational voltage is supplied to the electrical-power output terminal Tk-out.

Based on the driving operational voltage, the light-emitting drive unit 20c generates a driving signal for driving light-emitting elements 217A to be described later that are provided to the light-emitting unit 21 to emit light. The light-emitting drive unit 20c generates a driving signal according to an instruction from the micro-computer 20b, as such a driving signal. The driving signal is supplied to the electrical-power output terminal Tl-out.

The micro-computer 20b instructs the light-emitting drive unit 20c to perform lighting/extinction, light control, and the like, and performs a data communication with the electronic apparatus 4 side via the data communication terminal Td. The micro-computer 20b instructs the light-emitting drive unit 20c based on a result of the data communication with the electronic apparatus 4 side. Thus, it becomes possible to control the light-emitting operation of the light-emitting unit 21 in conjunction with the operational state of the electronic apparatus 4.

The example in which the light-emitting drive unit 20c is provided to the power-supply section 20 and the driving signal is supplied to the light-emitting unit 21 side via the electrical-power output terminal Tl-out has been described above. However, the light-emitting drive unit 20c may be provided on the light-emitting unit 21 side. In this case, the driving operational voltage generated by the power-supply circuit 20a is supplied to the electrical-power output terminal Tl-out.

In either case, an electrical power necessary to emit light only needs to be supplied to the electrical-power output terminal Tl-out.

In FIG. 5B, in an inner surface of the side wall lower end portion 201A of the power-supply section 20, the plurality of apparatus-holding members 203 for detachably holding the electronic apparatus 4 are formed.

In this example, corresponding to the held members 410, 410, and 410 provided on the electronic apparatus 4 side, three apparatus-holding members 203 are provided at intervals of 120°. The apparatus-holding members 203 of this example are formed to be a pin-like member.

Note that attachment of the electronic apparatus 4 with the apparatus-holding members 203 will be described later.

Next, the light-emitting unit 21 will be described.

In FIG. 4, the light-emitting unit 21 includes a light-emitting main-body portion 21A, an attachment bangle portion 214, and a plurality of bridge portions 215. The light-emitting main-body portion 21A has an almost-disk-shape outer shape in which a center portion is opened as an opening portion 213B. The attachment bangle portion 214 has a ring shape and is provided in a center portion of the opening portion 213B of the light-emitting main-body portion 21A. The plurality of bridge portions 215 connect between the light-emitting main-body portion 21A and the attachment bangle portion 214.

Further, a connector 21S for receiving a supply of an electrical power necessary to emit light from the power-supply section 20 is also provided to the light-emitting unit 21. The connector 21S is provided to a leading end portion of a cable pulled out from a predetermined position of the light-emitting unit 21. In this connector 21S, there is formed a terminal to be connected to the electrical-power output terminal Tl-out formed on the power-supply section 20 side.

By the connector 21S being connected to the power-supply section 20, those terminals are held in a connection state.

The light-emitting main-body portion 21A includes a light guide plate 211, a reflective film 212 formed on an upper surface side of the light guide plate 211, and a cover 213 formed so as to cover an inner peripheral portion of the light guide plate 211.

Figure 7A:
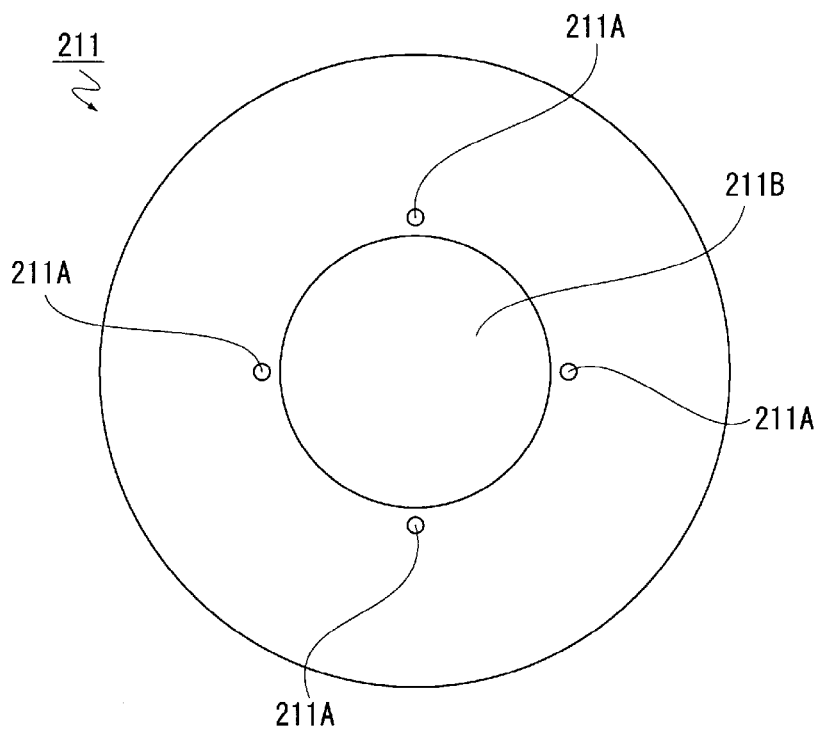
FIGS. 7A and 7B are a bottom view (FIG. 7A) of a light guide plate and a bottom view (FIG. 7B) of a light-emitting main-body portion.
Figure 7B:
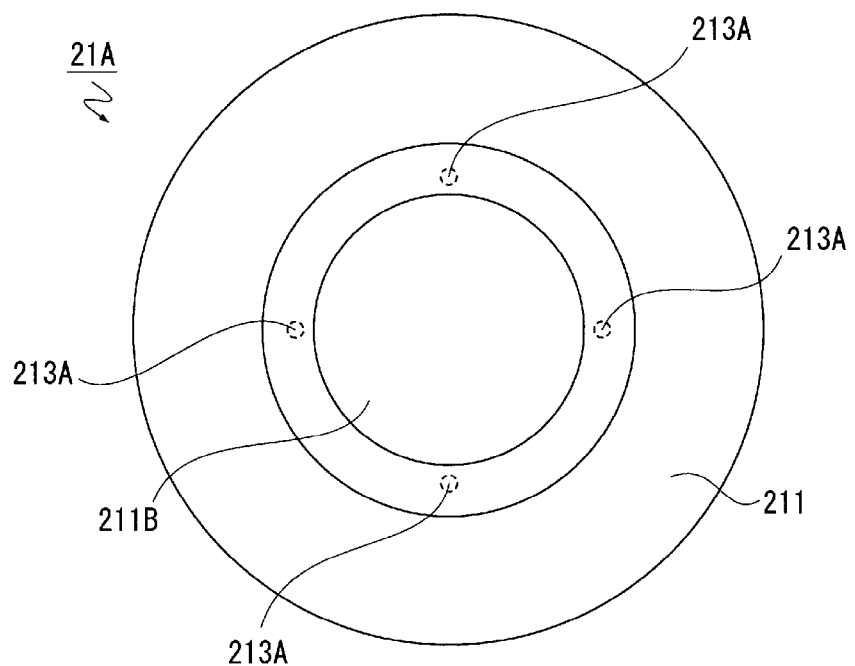
Figure 8A:
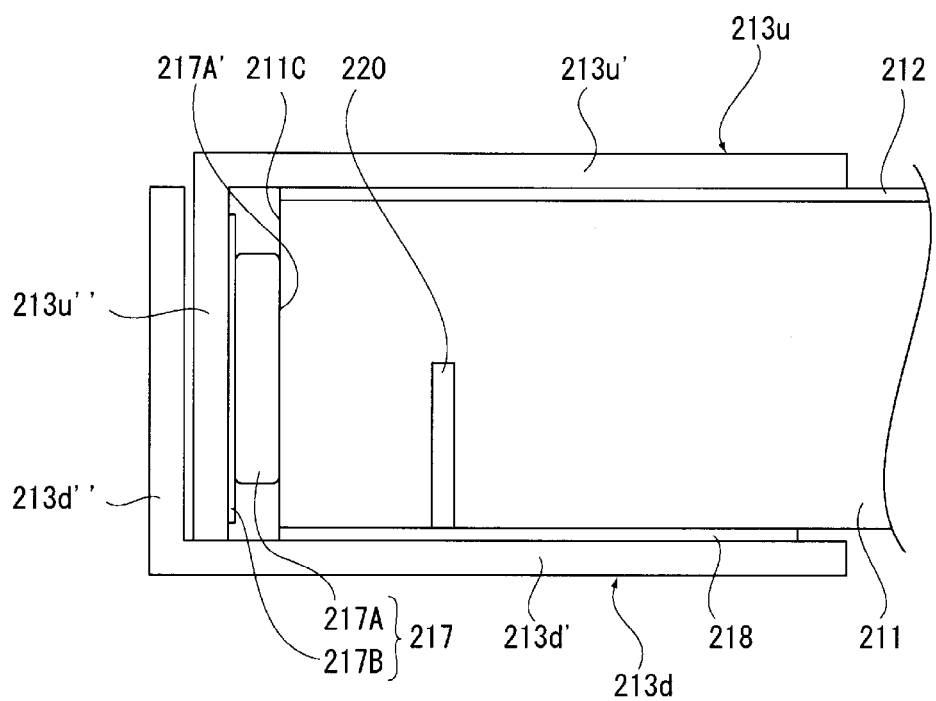
FIGS. 8A and 8B are an enlarged cross-sectional view (FIG. 8A) of an inner peripheral portion of the light-emitting main-body portion and a cross-sectional view (FIG. 8B) of the entire light-emitting main-body portion.
Figure 8B:
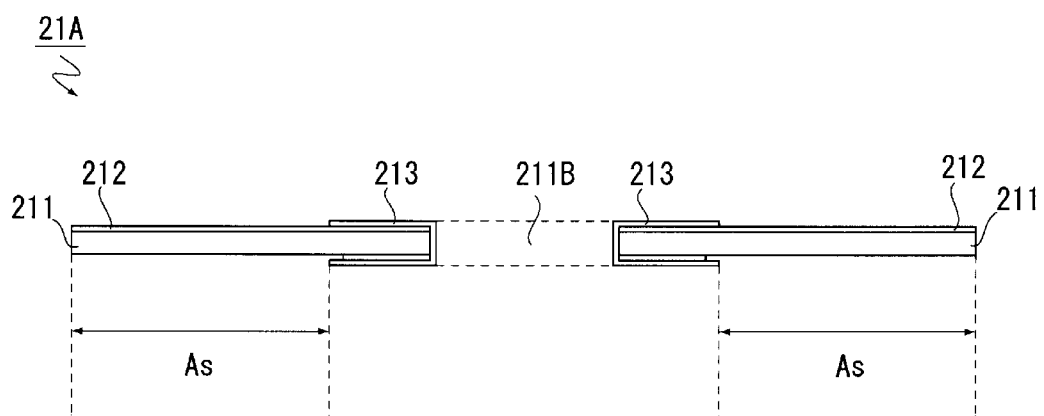

FIGS. 7A and 7B and FIGS. 8A and 8B are explanatory views of the light-emitting main-body portion 21A. FIG. 7A is a bottom view of the light guide plate 211, FIG. 7B is a bottom view of the light-emitting main-body portion 21A, and FIG. 8A is an enlarged cross-sectional view of the inner peripheral portion of the light-emitting main-body portion 21A, and FIG. 8B is a cross-sectional view of the entire light-emitting main-body portion 21A.

As shown in FIG. 7A, the light guide plate 211 has an almost-disk outer shape in which a center portion is opened as an opening portion 211B. The light guide plate 211 is made of a transparent material, for example, a transparent resin.

A plurality of pin insertion ports 211A are formed at predetermined positions of the light guide plate 211. In this example, four pin insertion ports 211A are formed.

The cover 213 includes annular-shape bottom and upper surfaces. The cover 213 includes the opening portion 213B in a center in an in-plane direction. As it can be seen from FIGS. 8A and 8B, a cross-section of the cover 213 when the cover 213 is partially cut has an almost U-shape. The U-shape is formed by a combination of an upper cover member 213$u$ and a lower cover member 213$d$ each having an L-shape cross-section when being partially cut (see FIG. 8A).

The upper cover member 213$u$ includes an upper surface portion 213$u$' and a side surface portion 213$u$" formed so as to be bent downward from the upper surface portion 213$u$' at a right angle. Further, the lower cover member 213$d$ includes a lower surface portion 213$d$' and a side surface portion 213$d$" formed so as to be bent upward from the lower surface portion 213$d$' at a right angle.

By the side surface portion 213$u$" of the upper cover member 213$u$ and the side surface portion 213$d$" of the lower cover member 213$d$ overlapping with each other, the almost U-shape is realized. In the case of this example, the side surface portion 213$u$" is positioned on an outer peripheral side with respect to the side surface portion 213$d$".

In a surface on the outer peripheral side of the side surface portion 213$u$", a light-emitting unit 217 constituted of the plurality of light-emitting elements 217A and a base plate portion 217B in which a wiring is formed for causing the light-emitting element 217A to emit light. As the base plate portion 217B, a flexible board is adopted in view of the fact that the side surface portion 213$u$" is peripherally formed. In the case of this example, an LED (light-emitting diode) is adopted as the light-emitting element 217A.

The reflective film 212 is formed on an upper surface of the light guide plate 211. Further, in an opposite surface of the upper surface of the light guide plate 211, that is, a surface to be the light output surface 2A in the room, a reflective film 218 is formed at a predetermined area of the inner peripheral portion thereof. The reflective film 218 is formed so as not to outwardly protrude from an outer peripheral edge of the lower surface portion 213$d$' when the lower cover member 213$d$ is bonded thereto.

Note that an upper surface of the light guide plate 211 can be restated as one surface of two surfaces of the light guide plate 211 that are parallel in the in-plane direction of the light guide plate 211. Further, the light output surface 2A of the light guide plate 211 can be restated as an opposite surface of the one surface.

In the light-emitting main-body portion 21A, as described above, the inner peripheral portion of the light guide plate 211 on which the reflective films 212 and 218 are formed is positioned in an U-shape space formed within the cover 213. Specifically, regarding the light guide plate 211, the inner peripheral portion thereof is positioned in the space within the cover 213 such that an inner wall 211C thereof is opposed to a light-emitting surface 217A' of the light-emitting element 217A provided in the cover 213.

In the lower surface portion 213$d$' of the lower cover member 213$d$, four pins 213A shown at respective positions of FIG. 7B are formed.

A structure as the light-emitting main-body portion 21A shown in FIG. 8A is realized by, for example, bonding the light guide plate 211 in a state in which the reflective films 212 and 218 are formed to the upper cover member 213$u$ in a surface on which the reflective film 212 is formed, and then bonding the lower cover member 213$d$ to the light guide plate 211 while inserting the pins 213A into the pin insertion ports 211A formed in the light guide plate 211. Note that, for this purpose, the positions at which the pin insertion ports 211A and the pins 213A are formed are accurately determined.

Note that the cover 213 is, for example, made of a metal such as an aluminum, and has a heat dissipation function of heat caused due to the light emission of the light-emitting element 217A.

In the light-emitting main-body portion 21A configured as described above, light (divergent light) emitted by the light-emitting element 217A is incident upon the inner wall 211C of the light guide plate 211. With this, the light tends to be propagated from the inner peripheral side to an outer peripheral side in the light guide plate 211.

At this time, the reflective film 212 is formed on an upper surface side of the light guide plate 211 and the reflective film 218 is formed in a partial portion on the inner peripheral side of the lower surface of the light guide plate 211, and hence the incident light as described above is output from the light output surface 2A of the light guide plate 211 due to the reflex action on the reflective films 212 and 218 (see FIG. 8B). At this time, the inner peripheral portion of the light guide plate 211 is covered with the cover 213, and hence light is output at an area of the light output surface 2A on the outer peripheral side with respect to the area covered with the cover 213. This area will be referred to as a light output area As as shown in FIG. 8B.

The light guide plate 211 in this embodiment is shaped for suppressing non-uniform light distribution in the room. This point will be described with reference to FIGS. 9A and 9B.

Figure 9A:
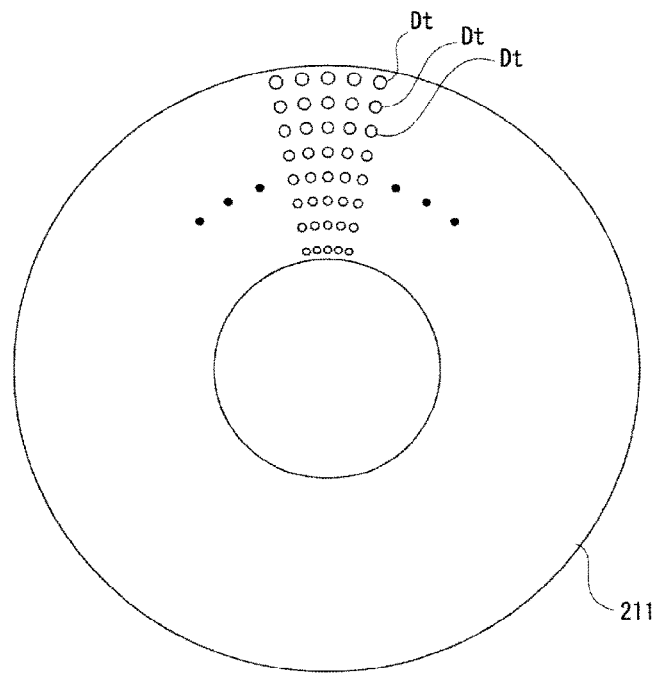
FIGS. 9A and 9B are explanatory views of a forming pattern of dots formed in the light guide plate.

FIG. 9A is a top view of the light guide plate 211.

As shown in the figure, a plurality of dots Dt are formed in the upper surface of the light guide plate 211.

The dots Dt are, for example, white and formed by printing. Note that the reflective film 212 is formed on the upper surface of the light guide plate 211 in which the dots Dt are formed in this manner.

The dots Dt can scatter light propagated in the light guide plate 211.

The dots Dt are radially formed in the upper surface of the light guide plate 211 and the dots Dt are formed at constant pitches from the inner peripheral side to the outer peripheral side. At the same time, the dots Dt are gradually increased in size from the inner peripheral side to the outer peripheral side of the light guide plate 211.

Figure 9B:
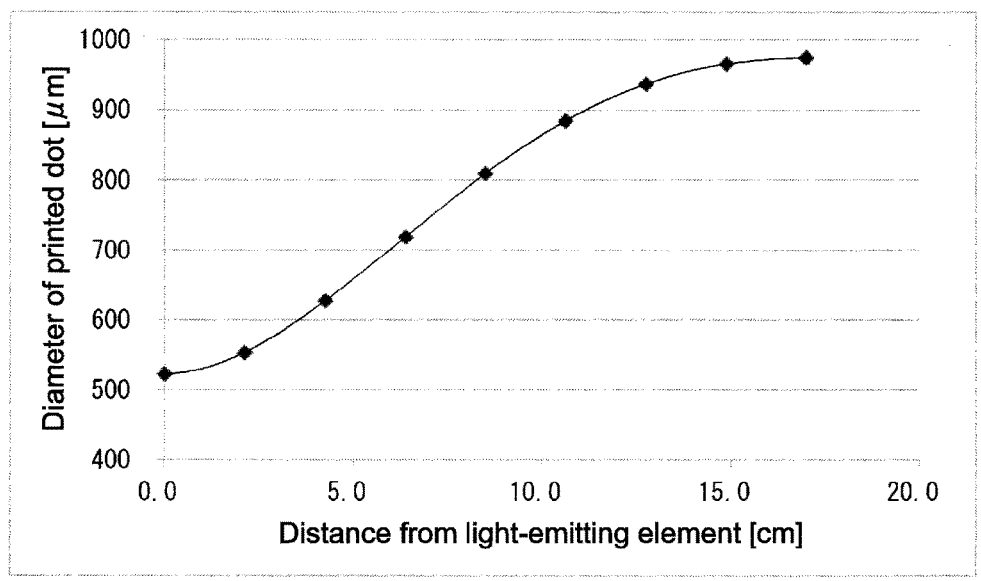

FIG. 9B is a view illustrating a relationship between a distance (cm) from the light-emitting element 217A and a dot diameter (μm). Note that the distance from the light-emitting element 217A means a distance when the position at which the light-emitting surface 217A' is formed is set as an innermost peripheral position (0 cm).

As shown in FIG. 9B, the relationship between the distance from the light-emitting element 217A and the dot diameter in this example is as follows: 0.0 cm point=523 μm, 2.1 cm point=554 μm, 4.3 cm point=627 μm, 6.4 cm point=719 μm, 8.5 cm point=810 μm, 10.6 cm point=885 μm, 12.8 cm point=938 μm, 14.9 cm point=966 μm, and 17.0 cm point=975 μm.

Regarding the dots Dt radially formed as described above, the dots Dt are formed at constant pitches from the inner peripheral side to the outer peripheral side and the dots Dt are gradually increased in size from the inner peripheral side to the outer peripheral side, and hence uniform light distribution of the light output from the light output surface 2A is realized.

Next, a configuration relating to the attachment of the light-emitting unit 21 to the power-supply section 20 will be described.

In FIG. 4, the attachment bangle portion 214 is provided for attaching the light-emitting unit 21 to the power-supply section 20.

In an inner peripheral side surface of the attachment bangle portion 214, a plurality of held members 216 for enabling the attachment to the power-supply section 20 to be performed are formed. In the case of this example, three held members 216 are provided to be spaced apart from one another at intervals of 120° corresponding to the light-emitting unit-holding portions 202, 202, and 202 formed in the power-supply section 20. Those held members 216 are formed to be pin-like members.

As mentioned above, the attachment bangle portion 214 is attached to the light-emitting main-body portion 21A by the bridge portions 215. In the case of this example, three bridge portions 215 are provided and those three bridge portions 215 are formed at angular positions corresponding to the positions at which the three light-emitting unit-holding portions 202 are similarly formed. Specifically, the bridge portions 215, 215, and 215 in this case are formed at the same angular positions as the light-emitting unit-holding portions 202, 202, and 202.

An inner diameter of the attachment bangle portion 214 is almost equal to an outer diameter of the side wall lower end portion 201A of the power-supply section 20.

Referring to FIGS. 10A-10E, a configuration of one of the light-emitting unit-holding portions 202 formed in the power-supply section 20 and an attachment process of the light-emitting unit 21 will be described.

Figure 10A:
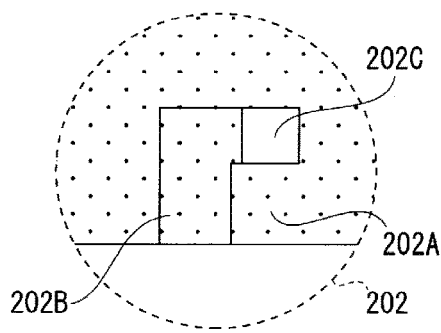
FIGS. 10A, 10B, 10C, 10D and 10E are explanatory views of a configuration of a light-emitting unit-holding portion formed in the power-supply section and an attachment process of the light-emitting unit.
Figure 10B:
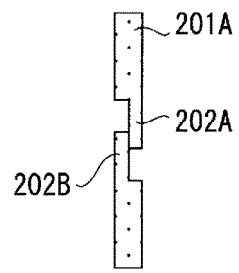

FIGS. 10A and 10B are a front view and a cross-sectional view of the light-emitting unit-holding portions 202, respectively. These figures illustrate a first mating pin and groove twist and lock arrangement by means of which the light emitting unit 21 is detachably attached to the outer periphery of the lower end portion 201A of the power-supply section 20.

Each of the light-emitting unit-holding portions 202 includes a first thin wall portion 202A, a second thin wall portion 202B, and an opening portion 202C that are formed in a rectangular shape. As shown in FIG. 10B, the first thin wall portion 202A is formed as a thinned portion as if the side wall lower end portion 201A is shaved from the inner peripheral side, and the second thin wall portion 202B is formed as a thinned portion as if the side wall lower end portion 201A is shaved from the outer peripheral side. The portion in which the second thin wall portion 202B is formed serves as a groove portion that is a recess extending on the inner peripheral side in a surface of the side wall lower end portion 201A on the outer peripheral side.

The opening portion 202C is formed with an upper portion of the portion of the side wall lower end portion 201A, in which the first thin wall portion 202A is formed, being opened in a rectangular shape.

The length of the second thin wall portion 202B in the vertical direction is set to be longer than the length of the first thin wall portion 202A in the vertical direction. The height of an upper end of the second thin wall portion 202B is the same as the height of an upper end of opening portion 202C.

Figure 10C:
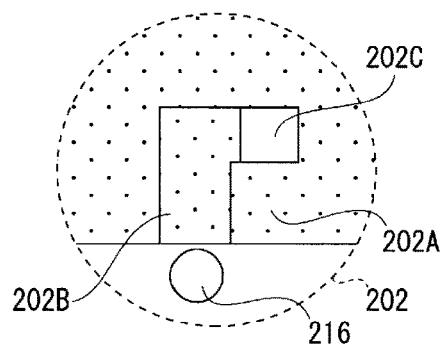
Figure 10D:
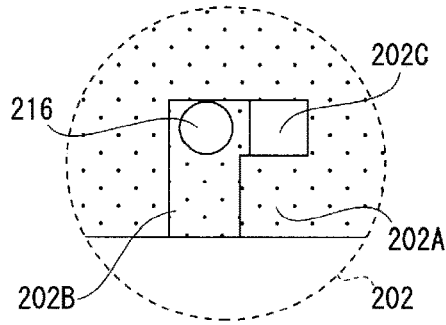
Figure 10E:
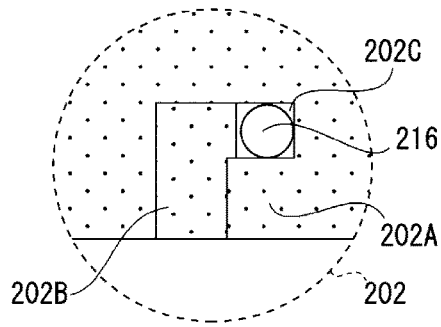

FIGS. 10C to 10E are explanatory views of the attachment of the light-emitting unit 21.

First, in order to attach the light-emitting unit 21 to the power-supply section 20, the user connects the connector 21S to a predetermined connection portion provided to the bottom surface 20D of the power-supply section 20, such that a terminal formed in the connector 21S and the electrical-power output terminal Tl-out are connected to each other.

After that, the user presses the attachment bangle portion 214 against the side wall lower end portion 201A of the power-supply section 20. At this time, if position relationships among the held members 216, 216, and 216 and the light-emitting unit-holding portions 202 are not appropriate, the held members 216, 216, and 216 bump against a lower end of the side wall lower end portion 201A, and the light-emitting unit 21 cannot be pushed up above the lower end of the side wall lower end portion 201A. That is because the inner diameter of the attachment bangle portion 214 in which the held members 216 are formed is almost the same as the outer diameter of the side wall lower end portion 201A as described above.

The attachment cannot be performed in the state in which the held members 216, 216, and 216 bump against the lower end of the side wall lower end portion 201A as described above, and hence the user rotates the light-emitting unit 21. By doing so, at a time when the rotation is performed by some degree, a state in which the held members 216, 216, and 216 correspond to the positions at which the second thin wall portions 202B, 202B, and 202B of the light-emitting unit-holding portions 202, 202, and 202 are formed is obtained (FIG. 10C).

As mentioned above, the portions of the side wall lower end portion 201A, in which the second thin wall portions 202B, 202B, and 202B are formed serve as the groove portions being the recesses extending on the inner peripheral side. Therefore, by pushing up the light-emitting unit 21 in the state in which the held members 216, 216, and 216 correspond to the positions at which the second thin wall portions 202B, 202B, and 202B are formed as described above, the held members 216, 216, and 216 can be moved in the upper direction along the second thin wall portions 202B, 202B, and 202B.

The length of the pins as the held members 216, 216, and 216 is set such that tips of the pins slide with some pressing force on the second thin wall portions 202B, 202B, and 202B when moving on the second thin wall portions 202B, 202B, and 202B as described above. At this time, the second thin wall portions 202B, 202B, and 202B are formed in a thin wall shape, and hence the second thin wall portions 202B, 202B, and 202B bow to the inner peripheral side due to the sliding of the held members 216, 216, and 216 as described above.

When the light-emitting unit 21 is further pushed up, the held members 216, 216, and 216 reach upper ends of the second thin wall portions 202B, 202B, and 202B, and a state in which the light-emitting unit 21 cannot be pushed up is obtained again (FIG. 10D).

When the light-emitting unit 21 is rotated in a counterclockwise direction from this state, the held members 216, 216, and 216 are inserted into the opening portions 202C, 202C, and 202C (FIG. 10 E).

At this time, the bowing of the second thin wall portions 202B, 202B, and 202B is released, and hence the held members 216, 216, and 216 inserted into the opening portions 202C, 202C, and 202C are locked.

With this, the attachment of the light-emitting unit 21 to the power-supply section 20 is completed.

Note that, in order to remove the light-emitting unit 21, by rotating the light-emitting unit 21 a clockwise direction from the state of FIG. 10E, the lock states of the held members 216, 216, and 216 by the light-emitting unit-holding portions 202, 202, and 202 are released. After that, the held members 216, 216, and 216 only needs to be pulled out from the light-emitting unit-holding portions 202, 202, and 202 by pulling down the light-emitting unit 21.

Figure 11:
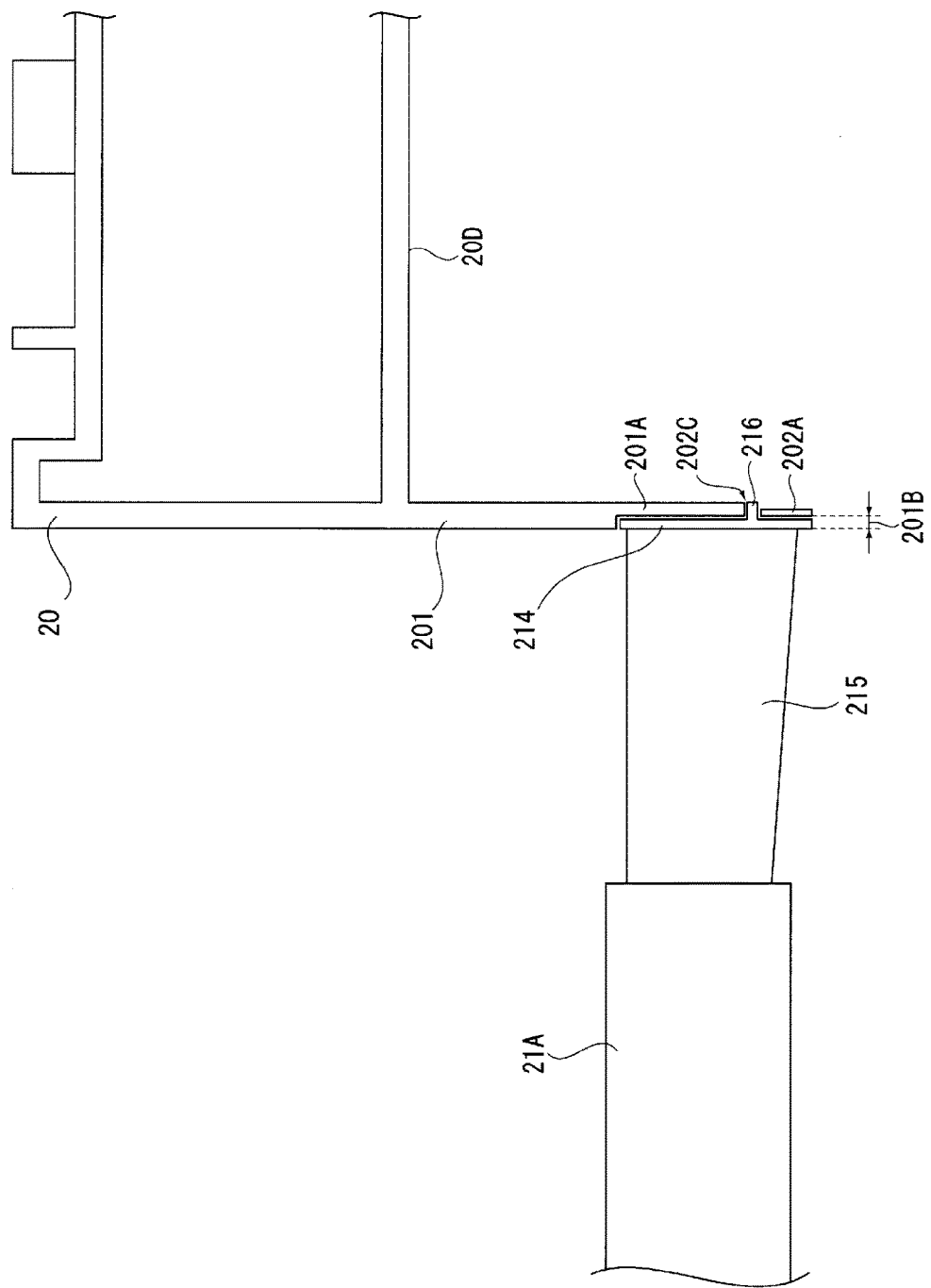
FIG. 11 is a cross-sectional structural view of the illumination apparatus in a state in which the light-emitting unit is attached to the power-supply section.

FIG. 11 is a cross-sectional structural view of the illumination apparatus 2 in a state in which the light-emitting unit 21 is attached to the power-supply section 20. Note that, in this figure, mainly only a portion relating to the attachment of the light-emitting unit 21 is extracted and shown.

As it can also be seen from this figure, the attachment of the light-emitting unit 21 to the power-supply section 20 is performed by fitting the attachment bangle portion 214 onto the step portion 201B formed on the outer peripheral side of the lower end portion of the side wall lower end portion 201A of the power-supply section 20.

3. Attachment of Electronic Apparatus

Figure 12A:
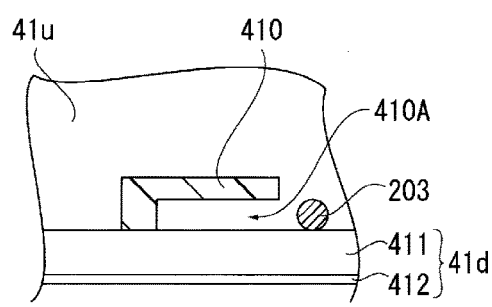
FIGS. 12A, 12B and 12C are explanatory views of the attachment of the electronic apparatus.
Figure 12B:
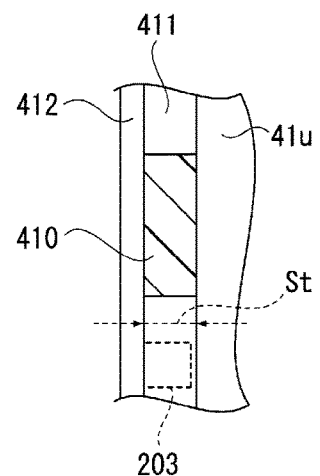
Figure 12C:
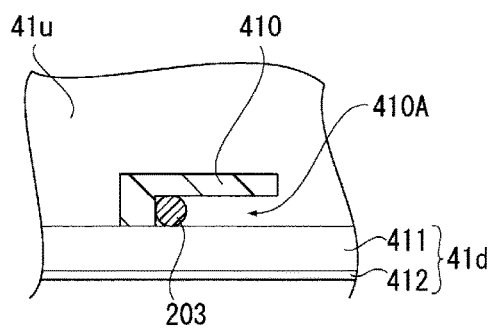

FIGS. 12A-12C are an explanatory view of attachment of the electronic apparatus 4.

FIG. 12A is a front view showing a portion of the electronic apparatus 4, in which the held members 410 are formed, in an enlarged state. FIG. 12B is a top view of the portion shown in FIG. 12A. These figures illustrate a second mating pin and groove twist and lock arrangement by means of which the electronic apparatus 4 is detachably attached to the inner periphery of the lower end portion 201A of the power-supply section 20.

Although not described with reference to FIGS. 2 and 3, a flange portion 412 is formed in the base plate 41d of the upper unit 41 of the electronic apparatus 4, the flange portion 412 extending in the entire lower end portion of the base plate 41d. A portion of the base plate 41d, which excludes the portion in which this flange portion 412 is formed, will be hereinafter referred to as a base plate upper portion 411.

As shown in FIG. 12B, when the portion of the electronic apparatus 4, in which the held members 410 are formed, is viewed from above, it can be seen that the flange portion 412 is positioned on an outermost peripheral side, the base plate upper portion 411 and the held members 410 are positioned on an inner peripheral side with respect to the flange portion 412, and the upper casing portion 41u is positioned on the inner peripheral side with respect to the base plate upper portion 411 and the held members 410.

An outer diameter of the base plate upper portion 411 is set to be almost the same as an inner diameter of the side wall lower end portion 201A of the illumination apparatus 2 (power-supply section 20).

The structure of the held members 410 is as described above. Here, a groove portion formed due to the provision of each of the held members 410 having an almost-L-shape outer shape, i.e., a space formed between a lower surface of the linear part corresponding to the longer leg of the L-shape of each of the held members 410 and an upper surface of the base plate upper portion 411 will be referred to as a groove portion 410A (FIG. 12A).

Taking the above into a consideration, the attachment of the electronic apparatus 4 to the illumination apparatus 2 will be described.

First, in order to attach the electronic apparatus 4 to the illumination apparatus 2, the user connects the connector 41S to a predetermined connection portion provided to the bottom surface 20D of the power-supply section 20, such that the electrical-power input terminal and data communication terminal formed in the connector 41S are connected to the electrical-power output terminal Tk-out and the data communication terminal Td, respectively.

After that, the user presses the base plate upper portion 411 of the electronic apparatus 4 against the side wall lower end portion 201A of the power-supply section 20. As mentioned above, the outer diameter of the base plate upper portion 411 is set to be almost the same as the inner diameter of the side wall lower end portion 201A and the outer diameter of the upper casing portion 41u formed on the base plate upper portion 411 is smaller than the outer diameter of the base plate upper portion 411. Therefore, as described above, by pressing the base plate upper portion 411 against the side wall lower end portion 201A, it becomes possible to insert the upper portion from the base plate upper portion 411 into the cavity portion inside the side wall lower end portion 201A.

At this time, the length of the pins serving as the apparatus-holding members 203, 203, and 203 formed inside the side wall lower end portion 201A is kept equal to or shorter than the length of at least an offset St (offset depending on a diameter difference between the upper casing portion 41u and the base plate upper portion 411) (see FIG. 12B). Therefore, an upper portion from the base plate upper portion 411 can be inserted into the cavity portion inside the side wall lower end portion 201A.

Further, at this time, due to the flange portion 412 provided to the base plate 41d, the electronic apparatus 4 is prevented from being pushed up into the cavity portion more than necessary.

When the electronic apparatus 4 is rotated in the state in which the upper portion from the base plate upper portion 411 is inserted into the cavity portion inside the side wall lower end portion 201A as described above, the apparatus-holding members 203, 203, and 203 can be positioned near the held members 410, 410, and 410 on the electronic apparatus 4 side as shown in FIGS. 12A and 12B.

Note that, as it can also be seen from the state of FIG. 12A, positions in the vertical direction at which the apparatus-holding members 203, 203, and 203 are formed in the side wall lower end portion 201A are set such that the apparatus-holding members 203, 203, and 203 are at the same height as the groove portions 410A, 410A, and 410A of the held members 410, 410, and 410 in the state in which the upper portion from the base plate upper portion 411 is inserted into the cavity portion inside the side wall lower end portion 201A as described above.

When the electronic apparatus 4 is further rotated in the counter-clockwise direction from the state of FIGS. 12A and 12B, the apparatus-holding members 203, 203, and 203 pass through the groove portions 410A, 410A, and 410A, and the apparatus-holding members 203, 203, and 203 reach deepest portions of the groove portions 410A, 410A, and 410A as shown in FIG. 12C. As a result, a state in which the electronic apparatus 4 cannot be further rotated is obtained.

With this, the attachment of the electronic apparatus 4 to the illumination apparatus 2 is completed.

Note that, in order to remove the electronic apparatus 4, it is sufficient that the apparatus-holding members 203, 203, and 203 are made detachable from the groove portions 410A, 410A, and 410A by rotating the electronic apparatus 4 in the clockwise direction from the state of FIG. 12C and then the electronic apparatus 4 is pulled down.

Figure 13:
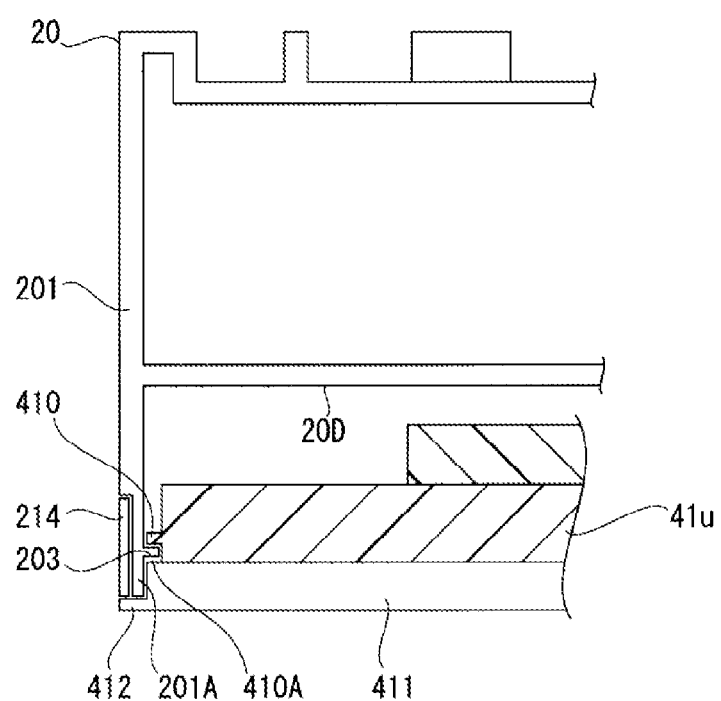
FIG. 13 is a cross-sectional structural view of the illumination apparatus and the electronic apparatus in a state in which the electronic apparatus is attached to the illumination apparatus.

FIG. 13 is a cross-sectional structural view of the illumination apparatus 2 and the electronic apparatus 4 in a state in which the electronic apparatus 4 is attached to the illumination apparatus 2. Note that, in this figure, mainly only a portion relating to the attachment of the electronic apparatus 4 is extracted and shown.

As it can also be seen also from this figure, the attachment of the electronic apparatus 4 to the illumination apparatus 2 is performed with the electronic apparatus 4 being held on the inner peripheral side of the side wall lower end portion 201A of the power-supply section 20.

Further, it can be seen from this figure that the electronic apparatus 4 is prevented from being unnecessarily pushed, by the upper surface of the flange portion 412 coming into contact with the lower end of the side wall lower end portion 201A.

In this embodiment, a center Cj of an apparatus-holding section 205 that holds the electronic apparatus 4 in the illumination apparatus 2 is positioned inside the light output area As of the light output surface 2A of the illumination apparatus 2.

Figure 14A:
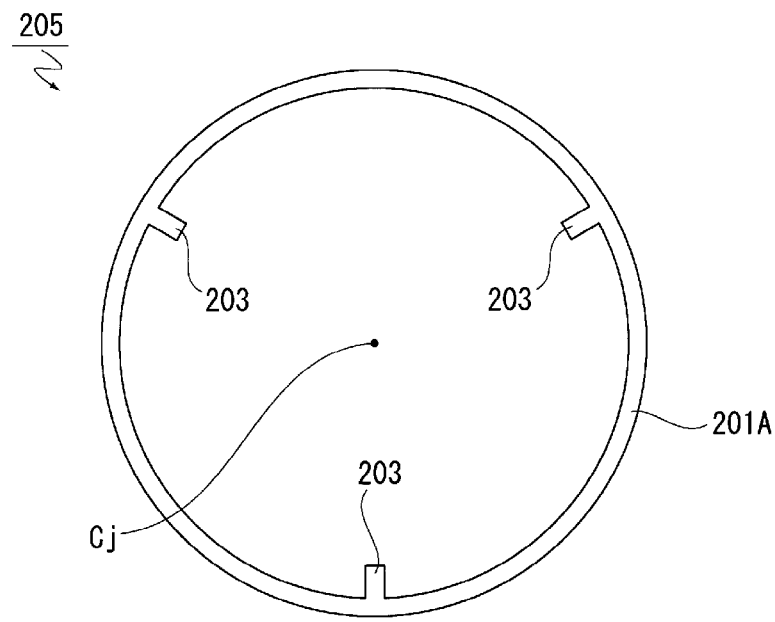
FIGS. 14A and 14B are explanatory views of a center of an apparatus-holding section and a center axis of the illumination apparatus.

FIG. 14A shows a concept of the apparatus-holding section 205 in the illumination apparatus 2. Note that FIG. 14A shows a cross-section structure when the side wall lower end portion 201A of the power-supply section 20 is cut at a height position at which the apparatus-holding members 203, 203, and 203 are formed.

As shown in the figure, a portion in which the apparatus-holding members 203, 203, and 203 are formed to hold the electronic apparatus 4 is the apparatus-holding section 205 in the illumination apparatus 2.

The center Cj of the apparatus-holding section 205 means an in-plane center of the apparatus-holding section 205 as shown in FIG. 14A. In other words, it is a center of a surface of the apparatus-holding section 205, which is parallel to the light output surface 2A.

Figure 14B:
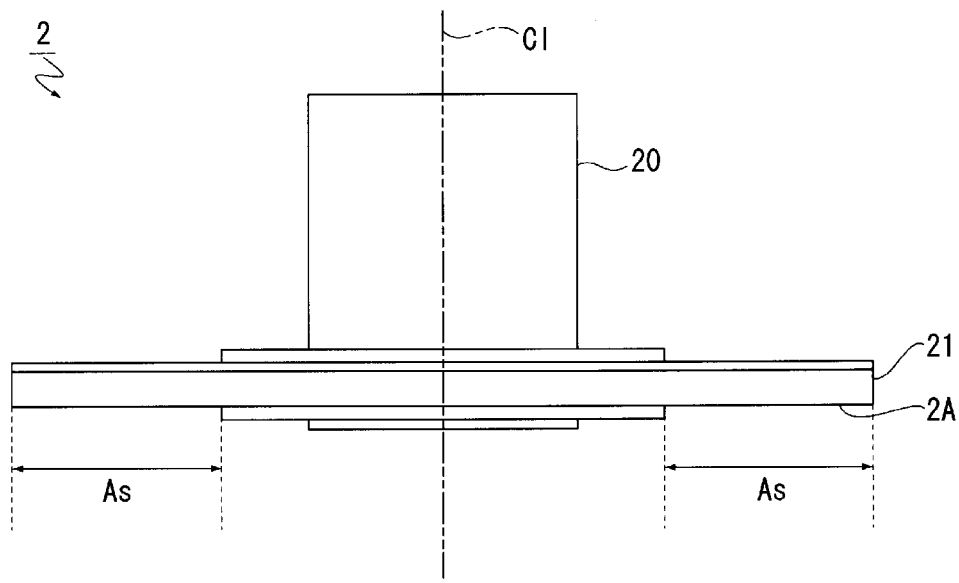

FIG. 14B is a view for explaining a center axis Cl of the illumination apparatus 2.

As in this example, in the case where the configuration in which the almost-disk-like light-emitting unit 21 having the opening portion 213B in a center thereof is provided and the power-supply section 20 is provided in a center portion of the opening portion 213B is adopted, the center axis Cl of the illumination apparatus 2 corresponds to an axis passing through an in-plane center of the light-emitting unit 21.

In the case of this example, the center axis of the power-supply section 20 having an almost-cylindrical shape corresponds to the center axis Cl of the illumination apparatus 2. Thus, the center Cj of the apparatus-holding section 205 also corresponds to the center axis Cl of the illumination apparatus 2.

Therefore, the center Cj of the apparatus-holding section 205 is located inside the light output area As of the light output surface 2A and the apparatus-holding section 205 itself is also present inside the light output area As.

4. Conclusion of Embodiment

As described above, in the illumination system 1 of this embodiment, the illumination apparatus 2 is configured in the following.

Specifically, the illumination apparatus 2 includes: the light-emitting unit 21 including the light guide plate 211 having a shape in which the center portion is opened, the light-emitting element 217A that inputs light from the inner wall 211C side of the light guide plate 211, and the reflective film 212 formed on the upper surface side of the light guide plate 211 to reflect light propagated in the light guide plate 211, the light-emitting unit 21 emitting light from the light output surface 2A of the light guide plate 211; and the apparatus-holding section 205 that detachably holds the electronic apparatus 4.

The apparatus-holding section 205 is configured to be capable of removing the electronic apparatus 4 in an output direction (i.e., downwards) of the light from the light output surface 2A and has the center Cj positioned inside the light output area As.

With the apparatus-holding section 205 as described above, it becomes possible to remove the electronic apparatus 4 without removing the illumination apparatus 2 from the ceiling rosette 100A. Further, the electronic apparatus 4 is held near the center portion of the illumination apparatus 2.

Therefore, unlike the case where the electronic apparatus 4 is located above the illumination apparatus, it is not difficult to exchange the electronic apparatus 4 and it is possible to freely exchange the electronic apparatus 4.

Further, the electronic apparatus 4 is held near the center portion of the illumination apparatus 2, and hence a light amount loss caused when light emitted from the light-emitting surface is interfered by the electronic apparatus 4 can be suppressed.

Further, with the light guide plate 211 having the above-mentioned structure, the light output surface 2A can be formed not as discontinuous surfaces but as a relatively large continuous surface. Therefore, it is possible to light up the entire room.

In addition, light is input from the inner wall 211C of the light guide plate 211, and hence the light can be distributed outwards, which can make difficult for the electronic apparatus 4 held by the illumination apparatus 2 to interfere with light output from the light output surface 2A. Therefore, non-uniform light emission in the room can be made difficult to occur. Thus, it is possible to uniformly light up the entire room.

As described above, according to this embodiment, the electronic apparatus can be made freely exchangeable as the illumination system to which the electronic apparatus can be attached. At the same time, it is possible to provide the illumination system having good lighting performance.

Further, in this embodiment, the apparatus-holding section 205 is positioned inside the light output area As.

With this, the amount of light emitted from the light output surface 2A to the electronic apparatus 4 is further reduced, which can further suppress the light amount loss.

In addition, in this embodiment, the power-supply section 20 including the built-in power-supply circuit 20a that generates an operational voltage based on the commercial AC power supply is provided and the light-emitting unit 21 is configured to be detachably attached to the power-supply section 20.

With this, it becomes easy to address a failure and the like, and hence the illumination system excellent in maintenance can be realized.

In addition, in this embodiment, in the light-emitting unit 21, the plurality of bridge portions 215 that connect between the light-emitting main-body portion 21A and the attachment bangle portion 214 are provided.

With this, when the light-emitting unit 21 is attached to the power-supply section 20, the user can predict the position of an attachment portion (held members 216) to the power-supply section 20 formed in the attachment bangle portion 214 based on the positions at which the bridge portions 215 are formed. Thus, it is possible to facilitate the attachment of the light-emitting unit 21 to the power-supply section 20.

In particular, in this example, the bridge portions 215 are formed at the same angular positions as the held members 216 formed in the attachment bangle portion 214, and hence it becomes easier to know the positions of the held members 216 upon attachment. Thus, it is possible to further enhance the attachment easiness of the light-emitting unit 21.

Additionally, in this embodiment, the illumination apparatus 2 includes the power-supply circuit 20a and the micro-computer 20b. Thus, the illumination apparatus 2 includes the electrical-power output terminal Tk-out for supplying the operational voltage generated by the power-supply circuit 20a to the electronic apparatus 4, and the data communication terminal Td for performing a data communication with the electronic apparatus 4.

With this, the power supply from the illumination apparatus 2 to the electronic apparatus 4 and the data communication between the illumination apparatus 2 and the electronic apparatus 4 can be performed.

By constructing the system in which the power is supplied from the illumination apparatus 2 to the electronic apparatus 4 and the data communication between the illumination apparatus 2 and the electronic apparatus 4 can be performed as described above, for example, the micro-computer 20b can control not to power the electronic apparatus 4 being an irregular product. Thus, a highly-secure system can be realized.

Further, the data communication between the illumination apparatus 2 and the electronic apparatus 4 can be performed, and hence lighting/extinction and light control of the light-emitting unit 21 can be performed in conjunction with an operational state of the electronic apparatus 4.

Further, in this embodiment, the plurality of dots Dt for scattering light are formed in the upper surface of the light guide plate 211.

With this, the control of a light distribution pattern becomes easy.

In order to scatter light by the light guide plate 211, one produced by mixing a diffusing agent can also be used for the light guide plate 211. However, it is difficult to precisely control the mixing ratio of the diffusing agent, and hence it is difficult to control the light distribution pattern. As described above, by employing the method of scattering light by the dots Dt, it is possible to relatively easily control the light distribution pattern by the forming pattern of the dots Dt.

In addition, in this embodiment, the dots Dt are formed at constant pitches from the inner peripheral side to the outer peripheral side of the light guide plate 211 and the dots Dt are gradually increased in size from the inner peripheral side to the outer peripheral side of the light guide plate 211.

With this, uniform light distribution is realized and the non-uniform light emission in the room can be prevented.

5. Modified Example

The present disclosure should not be limited to the above-mentioned specific example and various modified examples are conceivable.

For example, hereinabove, the example in which a lower portion from the flange portion 412 of the electronic apparatus 4 is located below the lower end of the illumination apparatus 2 when the electronic apparatus 4 is attached to the illumination apparatus 2 has been described.

Figure 15A:
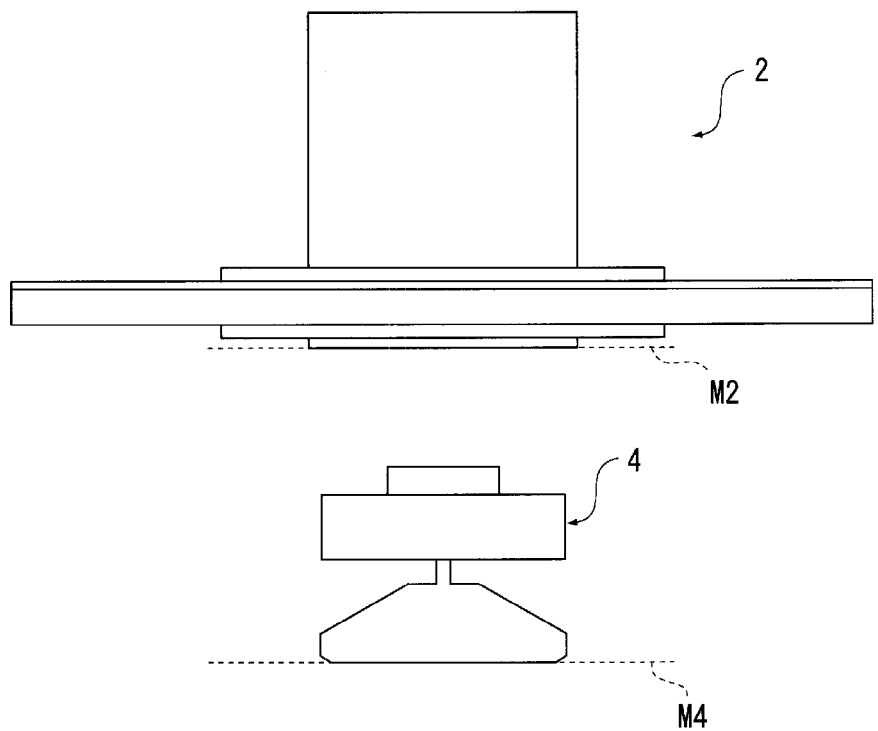
FIGS. 15A and 15B are explanatory views of a modified example relating to a position relationship between a lower end of the illumination apparatus and a lower end of the electronic apparatus.
Figure 15B:
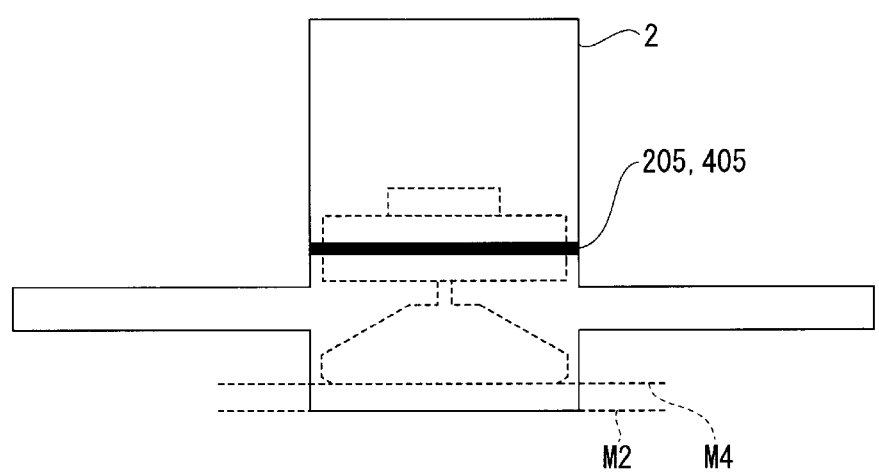

Specifically, as shown in FIG. 15A, defining a lower end M2 of the illumination apparatus 2 and a lower end M4 of the electronic apparatus 4, the lower end M4 of the electronic apparatus 4 is located below the lower end M2 of the illumination apparatus 2.

Note that, if the "light output direction" is used as a reference, the "lower end" can be restated as an "edge on the light output direction side." The lower end M2 of the illumination apparatus 2 illustrated in the embodiment corresponds to an edge of the side wall lower end portion 201A.

However, the lower end M4 of the electronic apparatus 4 does not necessarily need to be located below the lower end M2 of the illumination apparatus 2.

For example, it is assumed that the electronic apparatus 4 serves as an acoustic reproduction apparatus and a sound output opening of a speaker is positioned at a lower end of the acoustic reproduction apparatus. In this case, even when the sound output opening is positioned slightly above the lower end of the power-supply section 20 (i.e., lower end M2) in a state in which the electronic apparatus 4 serving as the acoustic reproduction apparatus is attached to the illumination apparatus 2, as long as there is no obstructions in a front surface of the sound output opening, the sound is appropriately output. Thus, the apparatus performance is not deteriorated.

Therefore, in such a case, the lower end M4 of the electronic apparatus 4 may be located above (or at the same height position as) the lower end M2 of the illumination apparatus 2.

Note that, as illustrated in the embodiment, examples of the case where it is desirable that the lower end M4 of the electronic apparatus 4 be located below the lower end M2 of the illumination apparatus 2 may include a case where the electronic apparatus 4 serves as a camera apparatus and a case where the electronic apparatus 4 serves as a projector apparatus.

For example, in the case of the camera apparatus, a part of the illumination apparatus 2 included in an image capturing field means a form of functional deterioration, and hence it is desirable that at least the lower end M4 of the electronic apparatus 4 be located below the lower end M2 of the illumination apparatus 2.

Also in the case of the projector apparatus, a part of a projected image interfered with the illumination apparatus 2 means functional deterioration, and hence it is desirable that at least the lower end M4 of the electronic apparatus 4 be located below the lower end M2 of the illumination apparatus 2.

By appropriately setting the position relationship between the lower end M2 of the illumination apparatus 2 and the lower end M4 of the electronic apparatus 4 depending on the type of the electronic apparatus 4 in this manner, it is possible to prevent the functional deterioration of the electronic apparatus 4 and the electronic apparatus 4 can sufficiently function.

The position relationship between the lower end M2 and the lower end M4 is determined by forming positions of a held section (section in which the held members 410, 410, and 410 are formed: hereinafter, referred to as "held section 405") in the electronic apparatus 4, and by forming positions of the apparatus-holding section 205 in the illumination apparatus 2. It is needless to say that the forming positions in this case refer to forming positions in the vertical direction.

FIG. 15A shows an example of forming positions of the held section 405 and the apparatus-holding section 205 when the lower end M4 of the electronic apparatus 4 is located above the lower end M2 of the illumination apparatus 2.

Note that the examples of the type of the electronic apparatus 4 are not limited to those illustrated above such as the acoustic reproduction apparatus, the projector apparatus, and the camera apparatus.

As the electronic apparatus according to the embodiment of the present disclosure, it is favorable use one capable of more effectively functioning when it is attached near a ceiling.

Further, the outer shapes of the illumination apparatus 2 and the electronic apparatus 4, structures of the respective units, and the like are also not limited to those illustrated above.

For example, the configuration for making the electronic apparatus 4 detachable is not limited to the mechanism of a combination of the pins and the receivers thereof as illustrated. For example, it can be realized by another configuration such as an attaching/detaching mechanism using magnetic force. In any cases, the configuration for making the electronic apparatus 4 detachable is not limited to a particular configuration and various configurations may be adopted.

Note that this point is also applied to the attachment/detachment of the light-emitting unit 21 to/from the power-supply section 20.

Further, the example in which the dots Dt are formed in the upper surface of the light guide plate 211 to scatter light has been described above, the dots Dt may be replaced by grooves. The grooves in this case may be formed by, for example, laser cutting. Also by forming the grooves instead of the dots Dt in this manner, the same effects as in the case of forming the dots Dt can be obtained.

Further, regarding the control of the light-emitting unit 21 depending on the operational state of the electronic apparatus 4, various types of control are conceivable. For example, in the case where the electronic apparatus 4 serves as the acoustic reproduction apparatus, light control of the light-emitting unit 21 may also be performed depending on a reproduced music type. Alternatively, it is also possible to control the light-emitting unit 21 to emit light in a predetermined flashing pattern in response to the start/end of the operation of the electronic apparatus 4, for example.

6. Present Disclosure

Note that the present disclosure may also take the following configurations.
(1) An illumination apparatus, including:
    a light-emitting unit including
        a light guide plate having a shape in which a center portion is opened,
        a light source configured to input light from a side of an inner wall of the light guide plate, and
        a reflective film that is formed on a side of an upper surface of the light guide plate and configured to reflect light propagated in the light guide plate, the light-emitting unit being configured to output light from a light output surface that is an opposite surface of the upper surface of the light guide plate; and
    an apparatus-holding section configured to detachably hold an electronic apparatus, the apparatus-holding section being configured to be capable of removing the electronic apparatus from a side of an output direction of light from the light output surface and including a center of a surface that is parallel to the light output surface, the center being positioned inside a light output area of the light output surface, the light output area being an area from which light is output.
(2) The illumination apparatus according to (1), in which
    the apparatus-holding section is positioned inside the light output area.
(3) The illumination apparatus according to (1) or (2), further including
    a power-supply section including a built-in power-supply circuit configured to generate an operational voltage based on a commercial alternating-current power supply, in which
    the light-emitting unit is configured to be detachably attached to the power-supply section.
(4) The illumination apparatus according to (3), in which
    the light-emitting unit includes
        a light-emitting main-body portion including the light guide plate,
        an attachment bungle portion that is attached to the power-supply section, and
        a plurality of bridge portions configured to connect between the light-emitting main-body portion and the attachment bangle portion.
(5) The illumination apparatus according to any one of (1) to (4), further including
    a power-supply circuit configured to generate an operational voltage based on a commercial alternating-current power supply;
    a micro-computer configured to operate based on the operational voltage generated by the power-supply circuit;
    an electrical power output terminal for supplying the operational voltage generated by the power-supply circuit to the electronic apparatus; and
    a data communication terminal for performing a data communication with the electronic apparatus.
(6) The illumination apparatus according to any one of (1) to (5), in which
    a plurality of dots or a plurality of grooves for scattering light are formed in the upper surface of the light guide plate.
(7) The illumination apparatus according to (6), in which
    the plurality of dots or the plurality of grooves are formed at constant pitches from an inner peripheral side to an outer peripheral side of the light guide plate and gradually increased in size from the inner peripheral side to the outer peripheral side of the light guide plate.
(8) An illumination system, including:
    an illumination apparatus; and
    an electronic apparatus, the electronic apparatus including
        a light-emitting unit including
            a light guide plate having a shape in which a center portion is opened,
            a light source configured to input light from a side of an inner wall of the light guide plate, and a reflective film that is formed on a side of an upper surface of the light guide plate and configured to reflect light propagated in the light guide plate, the light-emitting unit being configured to output light from a light output surface that is an opposite surface of the upper surface of the light guide plate; and an apparatus-holding section configured to detachably hold an electronic apparatus, the apparatus-holding section being configured to be capable of removing the electronic apparatus from a side of an output direction of light from the light output surface and including a center of a surface that is parallel to the light output surface, the center being positioned inside a light output area of the light output surface, the light output area being an area from which light is output, the electronic apparatus including a held section configured to be held by the apparatus-holding section.

(9) The illumination system according to (8), in which a forming position of the held section in the electronic apparatus and a forming position of the held section in the electronic apparatus are set such that an edge of the electronic apparatus on the side of the output direction of the light is located on the side of the output direction of the light with respect to an edge of the illumination apparatus on the side of the output direction of the light.

(10) The illumination system according to (9), in which the electronic apparatus is a camera apparatus or a projector apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An illumination apparatus comprising:
a light-emitting unit that includes (a) a light guide plate having an opening therethrough, (b) a light source to input light into the light guide plate, and (c) a reflective film at an upper surface of the light guide plate to reflect light propagated in the light guide plate out of a lower surface of the light guide plate; and
an apparatus-holding section extending through the opening and configured to detachably hold an apparatus at a lower end of the apparatus-holding section such that the apparatus is located below the lower surface of the light guide plate,
wherein the light guide plate and the apparatus-holding section are detachably attached to each other by a first twist and lock configuration, and the electronic apparatus is detachably attached to the apparatus-holding section by a second twist and lock configuration.

2. The illumination apparatus according to claim 1, further comprising a power-supply section including a built-in power-supply circuit configured to generate an operational voltage based on a commercial alternating-current power supply, wherein the light-emitting unit is configured to be detachably attached to the power-supply section.

3. The illumination apparatus according to claim 2, wherein the light-emitting unit includes:
a light-emitting main-body portion including the light guide plate,
an attachment bungle portion that is attached to the power-supply section, and
a plurality of bridge portions configured to connect between the light-emitting main-body portion and the attachment bangle portion.

4. The illumination apparatus according to claim 1, further comprising:
a power-supply circuit configured to generate an operational voltage based on a commercial alternating-current power supply;
a micro-computer configured to operate based on the operational voltage generated by the power-supply circuit;
an electrical power output terminal for supplying the operational voltage generated by the power-supply circuit to the electronic apparatus; and
a data communication terminal for performing a data communication with the electronic apparatus.

5. The illumination apparatus according to claim 1, wherein a plurality of dots or a plurality of grooves for scattering light are formed in the upper surface of the light guide plate.

6. The illumination apparatus according to claim 5, wherein the plurality of dots or the plurality of grooves are formed at constant pitches from an inner peripheral side to an outer peripheral side of the light guide plate and gradually increased in size from the inner peripheral side to the outer peripheral side of the light guide plate.

7. An illumination system comprising:
an illumination apparatus as set forth in claim 1; and
an electronic apparatus detachably attached to the apparatus holding section.

8. The illumination apparatus according to claim 7, further comprising a power-supply section including a built-in power-supply circuit configured to generate an operational voltage based on a commercial alternating-current power supply, wherein, the light-emitting unit is configured to be detachably attached to the power-supply section.

9. The illumination apparatus according to claim 8, wherein the light-emitting unit includes:
a light-emitting main-body portion including the light guide plate,
an attachment bungle portion that is attached to the power-supply section, and
a plurality of bridge portions configured to connect between the light-emitting main-body portion and the attachment bangle portion.

10. The illumination apparatus according to claim 7, further comprising:
power-supply circuit configured to generate an operational voltage based on a commercial alternating-current power supply;
a micro-computer configured to operate based on the operational voltage generated by the power-supply circuit;
an electrical power output terminal for supplying the operational voltage generated by the power-supply circuit to the electronic apparatus; and
a data communication terminal for performing a data communication with the electronic apparatus.

11. The illumination apparatus according to claim 7, wherein a plurality of dots or a plurality of grooves for scattering light are formed in the upper surface of the light guide plate.

12. The illumination apparatus according to claim 11, wherein the plurality of dots or the plurality of grooves are formed at constant pitches from an inner peripheral side to an outer peripheral side of the light guide plate and gradually increased in size from the inner peripheral side to the outer peripheral side of the light guide plate.

13. The illumination system according to claim 7, wherein a forming position of the held section in the electronic apparatus and a forming position of the held section in the electronic apparatus are set such that an edge of the electronic apparatus on the side of the output direction of the light is located on the side of the output direction of the light with respect to an edge of the illumination apparatus on the side of the output direction of the light.

14. The illumination system according to claim 7, wherein the electronic apparatus is a camera apparatus or a projector apparatus.

* * * * *